United States Patent
Zhang et al.

(10) Patent No.: US 11,881,931 B2
(45) Date of Patent: Jan. 23, 2024

(54) DATA TRANSMISSION TIME OBTAINING METHOD, APPARATUS, AND SYSTEM

(71) Applicant: HUAWEI TECHNOLOGIES CO., LTD., Shenzhen (CN)

(72) Inventors: Xiquan Zhang, Dongguan (CN); Jun Guo, Shenzhen (CN); Weixian Zhang, Dongguan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 9 days.

(21) Appl. No.: 17/696,626

(22) Filed: Mar. 16, 2022

(65) Prior Publication Data
US 2022/0209881 A1 Jun. 30, 2022

Related U.S. Application Data

(63) Continuation of application No. PCT/CN2020/115833, filed on Sep. 17, 2020.

(30) Foreign Application Priority Data

Sep. 17, 2019 (CN) .......................... 201910875786.4

(51) Int. Cl.
*H04J 3/06* (2006.01)
*H04B 3/54* (2006.01)

(52) U.S. Cl.
CPC ............ *H04J 3/0661* (2013.01); *H04B 3/542* (2013.01); *H04B 3/546* (2013.01)

(58) Field of Classification Search
CPC ...... H04J 3/0661; H04J 3/0667; H04B 3/542; H04B 3/546; H04B 3/54; H04B 3/46
See application file for complete search history.

(56) References Cited

U.S. PATENT DOCUMENTS 6,243,369 B1    6/2001  Grimwood et al.
2008/0151771 A1*  6/2008  Dowse ................ H04L 43/0858
                                                              370/252
(Continued)

FOREIGN PATENT DOCUMENTS

CN    101083523 A    12/2007
CN    102130735 A    7/2011
(Continued)

OTHER PUBLICATIONS

Garner, "IEEE 1588 Version 2," ISPCS Ann Arbor '08, pp. 1-89 (Sep. 24, 2008).

*Primary Examiner* — Steven Hieu D Nguyen
(74) *Attorney, Agent, or Firm* — Leydig, Voit & Mayer, Ltd.

(57) ABSTRACT

A data transmission time obtaining method, apparatus, and system are provided. The method includes: A first device sends a first packet to a second device, and obtains a first send timestamp of the first packet; the first device receives a second packet that is sent by the second device and that corresponds to the first packet, and obtains a first receive timestamp of the second packet; the first device calculates, based on timing frequency of the second device, a second receive timestamp at which the second device receives the first packet and a second send timestamp at which the second device sends the second packet; and the first device calculates a data transmission time between the first device and the second device based on the first send timestamp, the first receive timestamp, the second send timestamp, and the second receive timestamp.

17 Claims, 18 Drawing Sheets

(56) References Cited

U.S. PATENT DOCUMENTS

| | | | |
|---|---|---|---|
| 2009/0225743 A1 | 9/2009 | Nicholls et al. | |
| 2011/0251810 A1* | 10/2011 | Dzung | G01B 7/02 |
| | | | 324/76.77 |
| 2012/0159001 A1* | 6/2012 | Liu | H04L 69/02 |
| | | | 709/248 |
| 2014/0056318 A1* | 2/2014 | Hansson | H04L 43/0858 |
| | | | 370/503 |
| 2015/0117250 A1* | 4/2015 | Hwang | H04L 43/0858 |
| | | | 370/253 |
| 2017/0177697 A1* | 6/2017 | Lee | G06F 1/14 |

FOREIGN PATENT DOCUMENTS

| | | |
|---|---|---|
| CN | 102308180 A | 1/2012 |
| CN | 104702394 A | 6/2015 |
| CN | 105071833 A | 11/2015 |
| CN | 105743543 A | 7/2016 |
| CN | 106533600 A | 3/2017 |
| CN | 109257243 A | 1/2019 |
| CN | 109660281 A | 4/2019 |
| CN | 109699199 A | 4/2019 |
| EP | 1553716 A2 | 7/2005 |
| WO | 2006020002 A2 | 2/2006 |
| WO | 2016026215 A1 | 2/2016 |
| WO | 2018006686 A1 | 1/2018 |
| WO | 2019036943 A1 | 2/2019 |

* cited by examiner

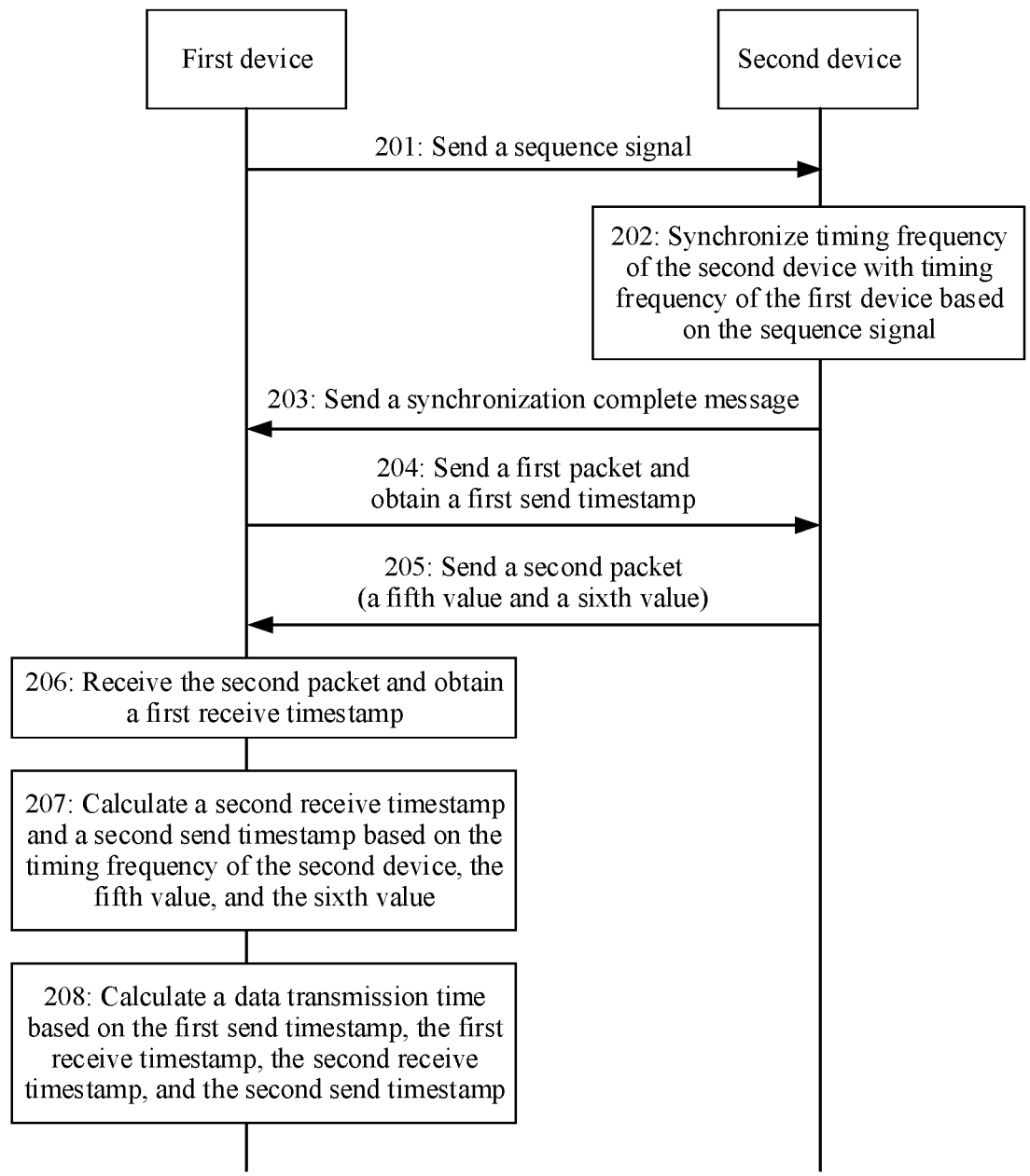

DATA TRANSMISSION TIME OBTAINING METHOD, APPARATUS, AND SYSTEM

CROSS-REFERENCE TO RELATED APPLICATIONS

This application is a continuation of International Application No. PCT/CN2020/115833, filed on Sep. 17, 2020, which claims priority to Chinese Patent Application No. 201910875786.4, filed on Sep. 17, 2019. The disclosures of the aforementioned applications are hereby incorporated by reference in their entireties.

TECHNICAL FIELD

Embodiments of this application relate to the communication field, and in particular, to a data transmission time obtaining method, apparatus, and system.

BACKGROUND

In power line communication (PLC), a power line transmitting currents may be used as a communication carrier. In this way, in a PLC network, a transmit end may load a carrier signal carrying data to the power line, and transmit the carrier signal through the power line. A receive end uses a dedicated demodulator to separate the carrier signal from the power line, and demodulates data from the carrier signal. It is sometimes necessary to measure a data transmission time between two devices in the PLC network. For example, the two devices may be two power substations. Sometimes a data transmission time between the two power substations needs to be measured, and a power line length between the two power substations is calculated based on the data transmission time. Currently, a data transmission time between two devices may be measured in the following two manners. For ease of description, the two devices are referred to as a first device and a second device. The two manners are as follows:

Both the first device and the second device receive a timing signal of a Beidou satellite or a global positioning system (GPS). The first device and the second device perform mutual time synchronization based on the timing signal. The first device sends a measurement packet to the second device, and the measurement packet includes a send timestamp at which the first device sends the measurement packet. The second device receives the measurement packet, obtains a receive timestamp at which the measurement packet is received, and obtains a data transmission time between the first device and the second device based on the receive timestamp and the send timestamp.

In a process of implementing this application, the inventor finds that the related technology has at least the following problem:

A synchronization circuit for synchronizing with the Beidou satellite or the GPS needs to be deployed in the first device, a timing signal of the Beidou satellite or the GPS is received by using the synchronization circuit, and a synchronization circuit also needs to be deployed in the second device. Consequently, costs are high.

SUMMARY

This application provides a data transmission time obtaining method, apparatus, and system, to obtain a data transmission time with lower costs. The technical solutions are as follows.

According to a first aspect, this application provides a data transmission time obtaining method. The method is applied to a power line communication (PLC) network. In the method, a first device sends a first packet to a second device and obtains a first send timestamp of the first packet. The first device receives a second packet that is sent by the second device and that corresponds to the first packet and obtains a first receive timestamp of the second packet. The first device calculates, based on timing frequency of the second device, a second receive timestamp at which the second device receives the first packet and a second send timestamp at which the second device sends the second packet. The first device calculates a data transmission time between the first device and the second device based on the first send timestamp, the first receive timestamp, the second send timestamp, and the second receive timestamp. Because the first device can accurately calculate, based on the timing frequency of the second device, the second receive timestamp at which the second device receives the first packet and the second send timestamp at which the second device sends the second packet, time synchronization between the first device and the second device is not required when a data transmission delay is being obtained. Therefore, no synchronization circuit needs to be disposed on the first device and the second device. This reduces costs.

In a possible implementation, the first device calculates the timing frequency of the second device based on timing frequency of the first device and a frequency offset between the timing frequency of the first device and the timing frequency of the second device. In this way, the first device can accurately obtain the timing frequency of the second device, so that the first device can accurately calculate the second receive timestamp and the second send timestamp, thereby improving accuracy of obtaining a data transmission time.

In another possible implementation, the first device receives a plurality of third packets sent by the second device at different moments, where any one of the plurality of third packets includes a first value, and the first value is a value displayed on a timestamp counter of the second device when the second device sends the third packet. The first device obtains a value displayed on a timestamp counter of the first device when the first device receives the third packet, to obtain a second value. The first device calculates the frequency offset based on the timing frequency of the first device, the first value included in each of the plurality of third packets, and each second value obtained by the first device. Because the first device can obtain the frequency offset by using the plurality of third packets, frequency offset calculation can be implemented only by receiving and sending packets by using existing PLC communication functions of the first device and the second device, and hardware of the first device and the second device does not need to be reconstructed, thereby reducing costs.

In another possible implementation, the first device sends a plurality of third packets to the second device at different moments, where each of the third packets includes a first value, the first value is a value displayed on a timestamp counter of the first device when the first device sends the third packet, and the plurality of third packets are used by the second device to calculate the frequency offset. The first device receives the frequency offset sent by the second device. Because the second device can obtain the frequency offset through calculation by using the plurality of third packets sent by the first device to the second device, frequency offset calculation can be implemented only by receiving and sending packets by using existing PLC communication functions of the first device and the second device, and hardware of the first device and the second device does not need to be reconstructed, thereby reducing costs.

In another possible implementation, the first device sends a sequence signal to the second device, where signal change frequency of the sequence signal is determined based on timing frequency of the first device, and the sequence signal is used by the second device to synchronize the timing frequency of the second device with the timing frequency of the first device. Because the signal change frequency of the sequence signal is determined based on the timing frequency of the first device, the second device can obtain the timing frequency of the first device based on the sequence signal, and synchronize the timing frequency of the second device with the timing frequency of the first device. In this way, the timing frequency of the second device can be synchronized with the timing frequency of the first device by transmitting the sequence signal by using existing PLC communication functions of the first device and the second device, and no synchronization circuit needs to be disposed on the first device and the second device. This reduces costs.

In another possible implementation, the first device includes timestamp counter, and the timestamp counter performs counting based on the timing frequency of the first device. The first device obtains a third value, where the third value is a value displayed on the timestamp counter of the first device when the first device sends the first packet. The first device obtains the first send timestamp of the first packet based on the third value and the timing frequency of the first device. In this way, the first device can accurately obtain the first send timestamp of the first packet.

In another possible implementation, the first device obtains a fourth value, where the fourth value is a value displayed on the timestamp counter of the first device when the first device receives the second packet. The first device obtains the first receive timestamp of the second packet based on the fourth value and the timing frequency of the first device. In this way, the first device can accurately obtain a first receive timestamp of the first packet.

In another possible implementation, the second packet includes a fifth value and a sixth value, the fifth value is a value displayed on the timestamp counter of the second device when the second device receives the first packet, the sixth value is a value displayed on the timestamp counter of the second device when the second device sends the second packet, and the timestamp counter of the second device is configured to perform counting based on the timing frequency of the second device. The first device calculates, based on the fifth value and the timing frequency of the second device, a second receive timestamp at which the second device receives the first packet; and calculates, based on the sixth value and the timing frequency of the second device, a second send timestamp at which the second device sends the second packet. Because the first device has obtained the timing frequency of the second device, the first device can accurately calculate the second receive timestamp based on the fifth value and the timing frequency of the second device, and can accurately calculate the second send timestamp based on the sixth value and the timing frequency of the second device, thereby improving accuracy of an obtained data transmission time.

According to a second aspect, this application provides a data transmission time obtaining apparatus, to perform the method according to the first aspect or any possible implementation of the first aspect. Specifically, the apparatus includes units configured to perform the foregoing method.

According to a third aspect, an embodiment of this application provides a data transmission time obtaining apparatus. The apparatus includes a PLC communication module, a processor, and a memory. The PLC communication module, the processor, and the memory may be connected to each other by using a bus system. The memory is configured to store one or more programs, and the processor is configured to execute the one or more programs in the memory to complete the foregoing method.

The apparatus further includes a gateway communication module, and the gateway communication module is connected to the processor. The gateway communication module is further connected to the PLC communication module.

According to a fourth aspect, this application provides a computer-readable storage medium. The computer-readable storage medium stores instructions. When the instructions are run on a processor, the processor is enabled to perform the foregoing method.

According to a fifth aspect, this application provides a computer program product including instructions. When the computer program product runs on a processor, the processor is enabled to perform the foregoing method.

According to a sixth aspect, this application provides a data transmission time obtaining system. The system includes a first device and a second device. The first device sends a first packet to the second device and obtains a first send timestamp of the first packet. The second device receives the first packet, and sends a second packet to the first device. The first device receives the second packet and obtains a first receive timestamp of the second packet. The first device calculates, based on timing frequency of the second device, a second receive timestamp at which the second device receives the first packet and a second send timestamp at which the second device sends the second packet. The first device calculates a data transmission time between the first device and the second device based on the first send timestamp, the first receive timestamp, the second send timestamp, and the second receive timestamp. Because the first device can accurately calculate, based on the timing frequency of the second device, the second receive timestamp at which the second device receives the first packet and the second send timestamp at which the second device sends the second packet, time synchronization between the first device and the second device is not required when a data transmission delay is being obtained. Therefore, no synchronization circuit needs to be disposed on the first device and the second device. This reduces costs.

BRIEF DESCRIPTION OF DRAWINGS

FIG. 9 is a schematic diagram of a structure of a third packet according to an embodiment of this application;

FIG. 10 is a flowchart of another data transmission time obtaining method according to an embodiment of this application;

DESCRIPTION OF EMBODIMENTS

A PLC communication network may be a power transmission network, a power distribution network, or the like. The power transmission network is a power feeding network connecting a power plant and a power substation and connecting one power substation and another power substation, and is configured to transmit, over a long distance, electric energy generated by the power plant. For example, refer to a power transmission network shown in FIG. 1. The power transmission network includes facilities such as a power plant a and a plurality of power substations b. The power plant a and the plurality of power substations b are connected through power lines.

The power distribution network includes multi-level power distribution equipment, receives electric energy from the power transmission network, and distributes the electric energy to networks of various power-consuming equipments by using the multi-level power distribution equipment. For example, refer to a power distribution network shown in FIG. 2 or FIG. 3. The power distribution network includes a plurality of power distribution equipments. The plurality of power distribution equipments are divided into M levels (in FIG. 1, an example in which M=3 is used for description), and each level includes at least one power distribution equipment, where M is an integer greater than 1. For example, when M is 2, the plurality of power distribution equipments include at least one first-level power distribution equipment 11 and at least one second-level power distribution equipment 12. For example, when M is 5, the plurality of power distribution equipments include at least one first-level power distribution equipment 11, at least one second-level power distribution equipment 12, . . . , and at least one fifth-level power distribution equipment 15.

An input terminal of $i^{th}$-level power distribution equipment is connected to one output terminal of $(i-1)^{th}$-level power distribution equipment through a power line, where i=2, 3, . . . , or M. An input terminal of the first-level power distribution equipment 11 is connected to an output terminal of a transformer, and an input terminal of the transformer is connected to the power transmission network.

Figure 2:
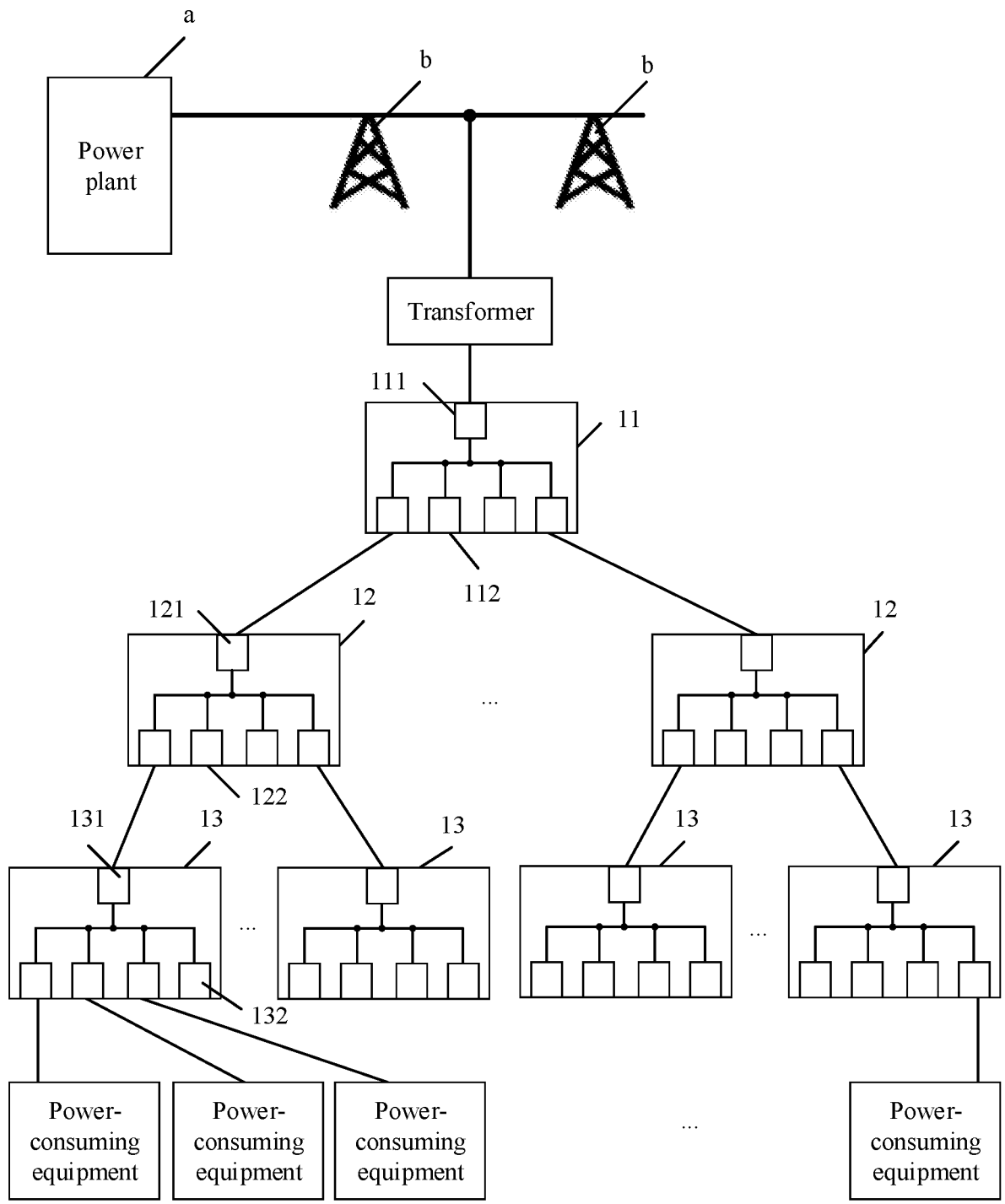
FIG. 2 is a schematic diagram of a structure of a power distribution network according to an embodiment of this application.

Optionally, as shown in FIG. 2, an output terminal of $M^{th}$-level power distribution equipment 1M is connected to power-consuming equipment, and the $M^{th}$-level power distribution equipment transmits electric energy received by the power distribution network from the power transmission network to the power-consuming equipment. Alternatively, some output terminals of each power distribution equipment in the power distribution network are connected to next-level power distribution equipment, some other output terminals are connected to the power-consuming equipment, and each power distribution equipment transmits the electric energy received by the power distribution network from the power transmission network to the power-consuming equipment and the next-level power distribution equipment.

Optionally, the power distribution network shown in FIG. 2 may be a medium-low-voltage power distribution network, and the power distribution equipments in the power distribution network may be distribution cabinets, distribution boxes, or the like. In the power distribution network, an output terminal of each $M^{th}$-level power distribution equipment 1M is connected to the power-consuming equipment. For example, the power distribution network is a power distribution network that is set in a residential community, and a structure of the power distribution network may be shown in FIG. 2. The first-level power distribution equipment 11 is connected to the power transmission network by using the transformer. Each residential building in the residential community is provided with second-level power distribution equipment 12. An input terminal 121 of each second-level power distribution equipment 12 is connected to an input terminal 111 of the first-level power distribution equipment 11. Each floor of the residential building is provided with third-level power distribution equipment 13. An input terminal 131 of the third-level power distribution equipment 13 is connected to an output terminal 122 of the second-level power distribution equipment 12 located in the residential building. An output terminal 132 of each third-level power distribution equipment 13 may be connected to power-consuming equipment in a house of a family located in the residential building.

Figure 3:
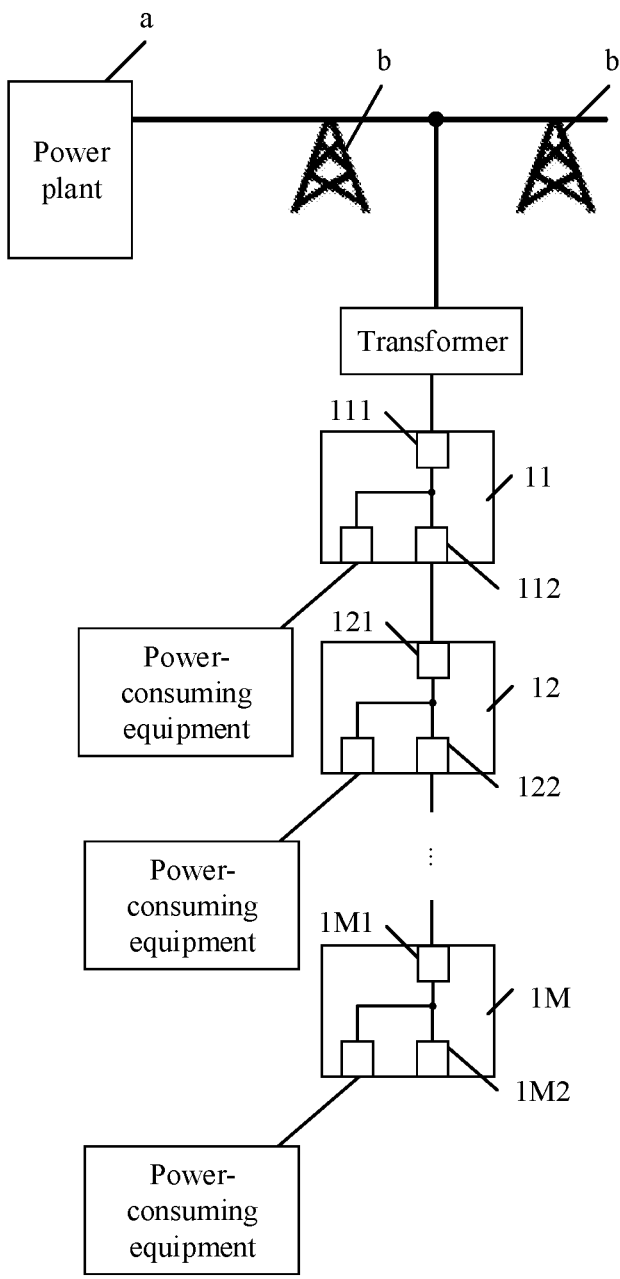
FIG. 3 is a schematic diagram of a structure of another power distribution network according to an embodiment of this application.

The power distribution network shown in FIG. 3 may be a street light network or an airport intelligent navigation light network. In addition to next-level power distribution equipment, each power distribution equipment in the power distribution network is also connected to the power-consuming equipment. Power distribution equipment in the power distribution network may be a micro distribution box, and the power distribution equipment usually includes a small quantity of output terminals. For example, as shown in FIG. 3, the power distribution equipment may include two output terminals, one output terminal is connected to the next-level power distribution equipment, and the other output terminal is connected to the power-consuming equipment.

There is a demand to measure a data transmission time between devices both in the power transmission network and the power distribution network. For example, in the power transmission network, a length of a power line connecting two power substations sometimes needs to be measured. For ease of description, the two power substations are referred to as a first power substation and a second power substation. A first device may be disposed on the first power substation, and a second device may be disposed on the second power substation. The first device and the second device are both connected to the power transmission network. The first device may send a first packet to the second device, then receive a second packet that is sent by the second device and that corresponds to the first packet, measure a data transmission time between the first device and the second device based on the first packet and the second packet, and calculate a power line length between the first device and the second device based on the data transmission time. The power line length is a power line length between the first power substation and the second power substation. A detailed implementation process in which the first device measures the data transmission time between the first device and the second device based on the first packet and the second packet is to be described in the embodiment shown in FIG. 8 or FIG. 10, and is not described in detail herein.

Figure 4:
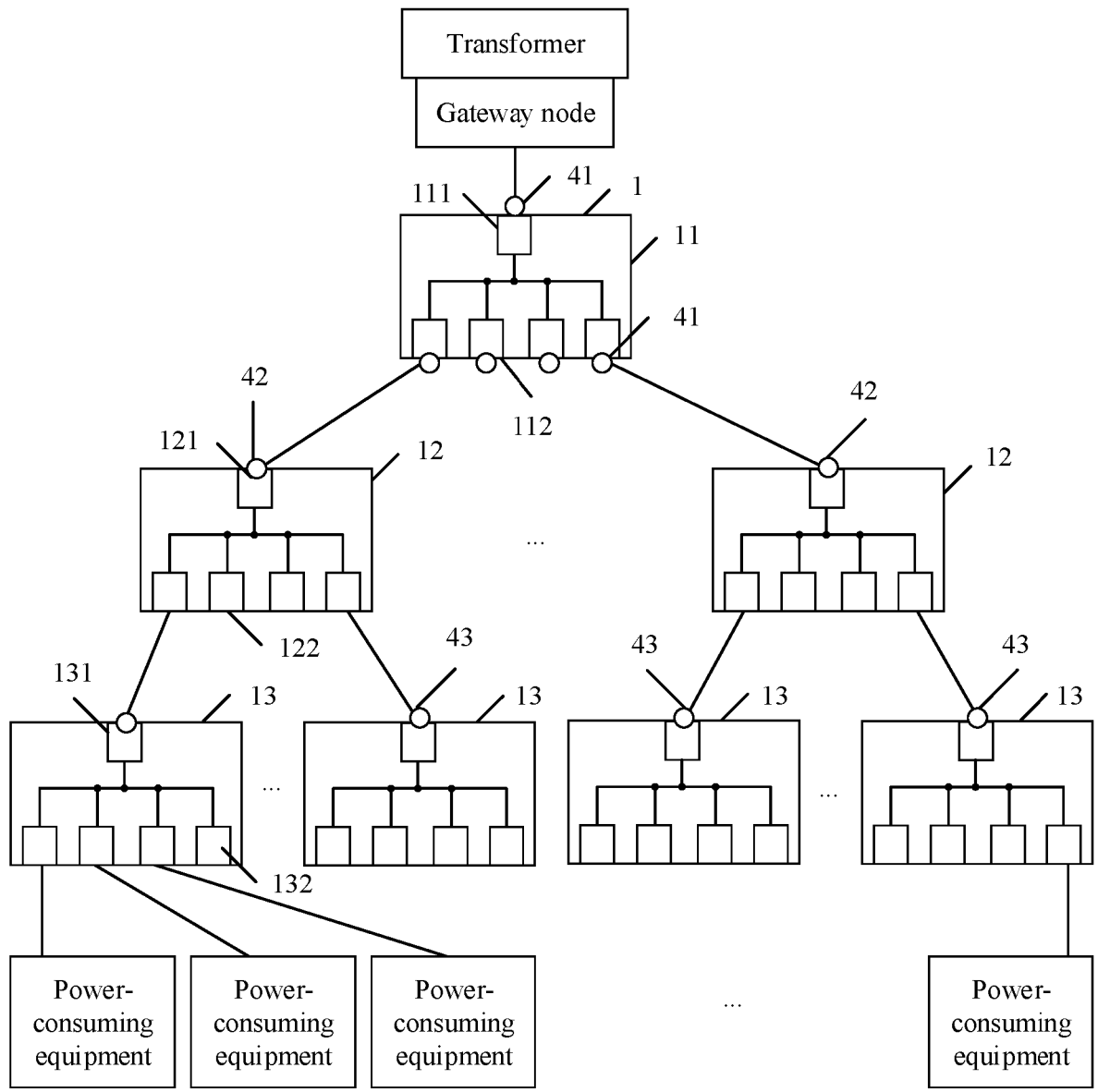
FIG. 4 is a schematic diagram of a structure of another power distribution network according to an embodiment of this application.

For another example, a physical network topology diagram of a power distribution network needs to be generated in a power distribution network. The physical network topology diagram includes a connection relationship between power distribution equipments in the power distribution network. Refer to FIG. 4. To generate the physical network topology diagram of the power distribution network, a gateway node may be provided between a transformer and first-level power distribution equipment 11, and a node may be disposed on each power distribution equipment in the power distribution network. The gateway node has a PLC function, and may implement functions such as receiving or sending a packet in the power distribution network. The node also has a PLC communication function, and may implement functions such as receiving or sending a packet in the power distribution network. In this way, when the physical network topology diagram of the power distribution network is generated, the gateway node may send a first packet to the node in the power distribution network, receive a second packet that is sent by the node in the power distribution network and that corresponds to the first packet, measure a data transmission time between the gateway node and the node in the power distribution network based on the first packet and the second packet, and generate the physical network topology diagram of the power distribution network based on the data transmission time between the gateway node and each node in the power distribution network. A detailed implementation process in which the gateway node measures the data transmission time between the gateway node and each node in the power distribution network is to be described in the embodiment shown in FIG. 8 or FIG. 10, and is not described in detail herein. In addition, a detailed implementation process in which the gateway node generates the physical network topology diagram of the power distribution network is to be described in the embodiment shown in FIG. 12A and FIG. 12B, and is not described in detail herein.

It should be noted that for any power distribution equipment in the power distribution network and at least one node that is disposed on the power distribution equipment, the at least one node may be disposed at an input terminal and/or an output terminal of the power distribution equipment. For ease of description, a node located on the first-level power distribution equipment 11 is referred to as a first-level node 41, a node located on the second-level power distribution equipment 12 is referred to as a second-level node 42, . . . , and a node located on the $M^{th}$-level power distribution equipment 1M is referred to as an $M^{th}$-level node 4M (not shown in FIG. 4).

Figure 5:
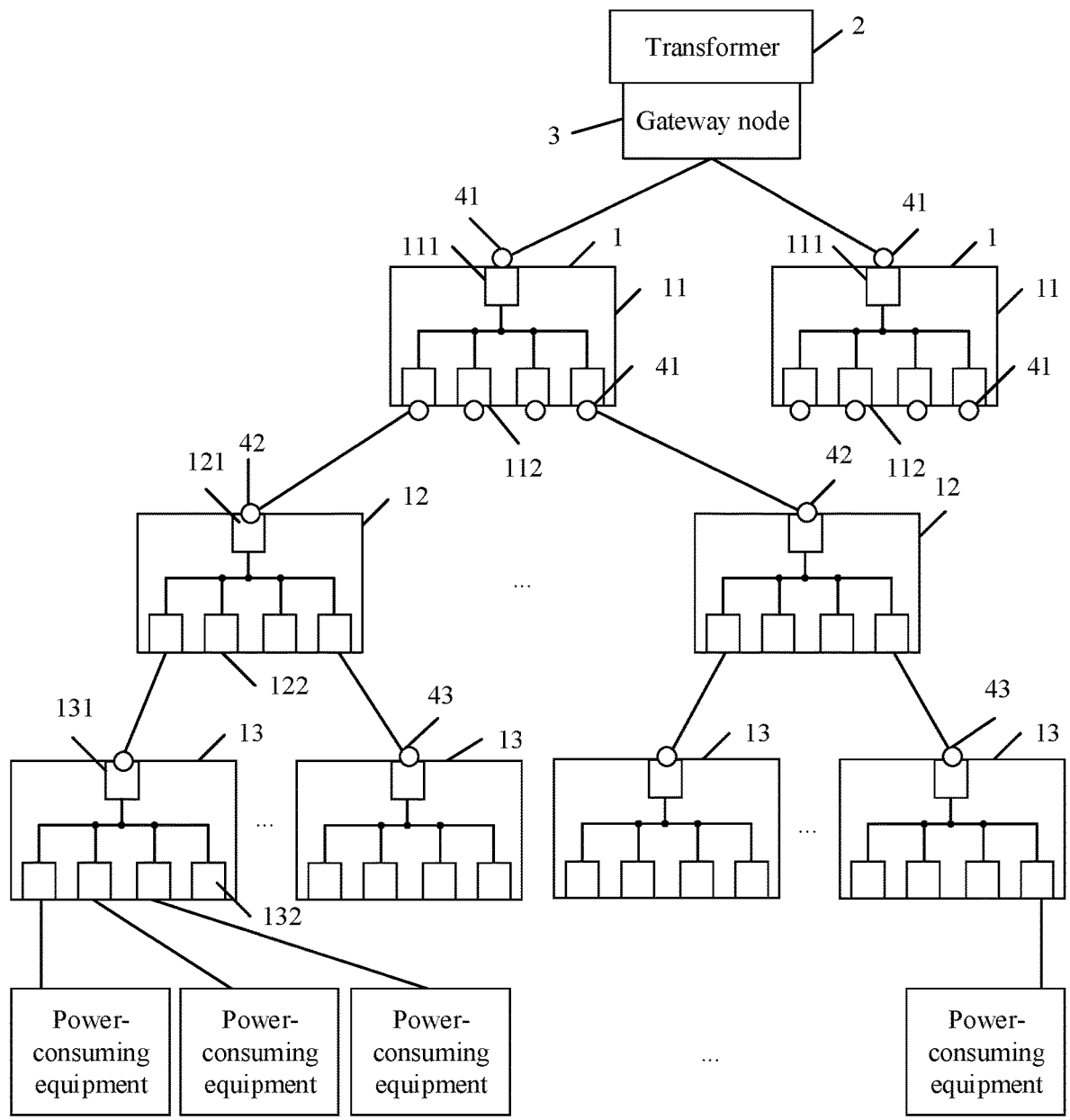
FIG. 5 is a schematic diagram of a structure of another power distribution network according to an embodiment of this application.

Refer to FIG. 4 or FIG. 5. The gateway node may be located at an output terminal of a transformer. For any power distribution equipment in the power distribution network, the power distribution equipment may be provided with one or more nodes. When power distribution equipment is provided with one node, the node may be located at an input terminal or an output terminal of the power distribution equipment. When the power distribution equipment is provided with a plurality of nodes, one node may be disposed at an input terminal of the power distribution equipment, and one node may be disposed at each output terminal of the power distribution equipment.

Usually, to reduce costs, one first-level node 41 is disposed at each of an input terminal and an output terminal of each first-level power distribution equipment 11, and one node is disposed at an input terminal of each another-level power distribution equipment.

For any power distribution equipment in the power distribution network, each node located on the power distribution equipment stores basic information about the power distribution equipment. The basic information may include at least one of the following information: an identifier of the power distribution equipment, a position of the power distribution equipment, an identifier of each output terminal of the power distribution equipment, and the like.

Optionally, the identifier of the power distribution equipment may be a number of the power distribution equipment or the like.

Optionally, the basic information about the power distribution equipment stored in the node on the power distribution equipment may be entered by a skilled person. For example, it is assumed that the skilled person installs the power distribution equipment on a floor of a residential building in the residential community. The skilled person may enter a position of the power distribution equipment in the node on the power distribution equipment, where the position includes information such as a number of the residential building and a number of the floor. The node may receive the entered position of the power distribution equipment, read the information such as the number of the power distribution equipment from the power distribution equipment to obtain the basic information about the power distribution equipment, and then store the basic information about the power distribution equipment.

Figure 6:
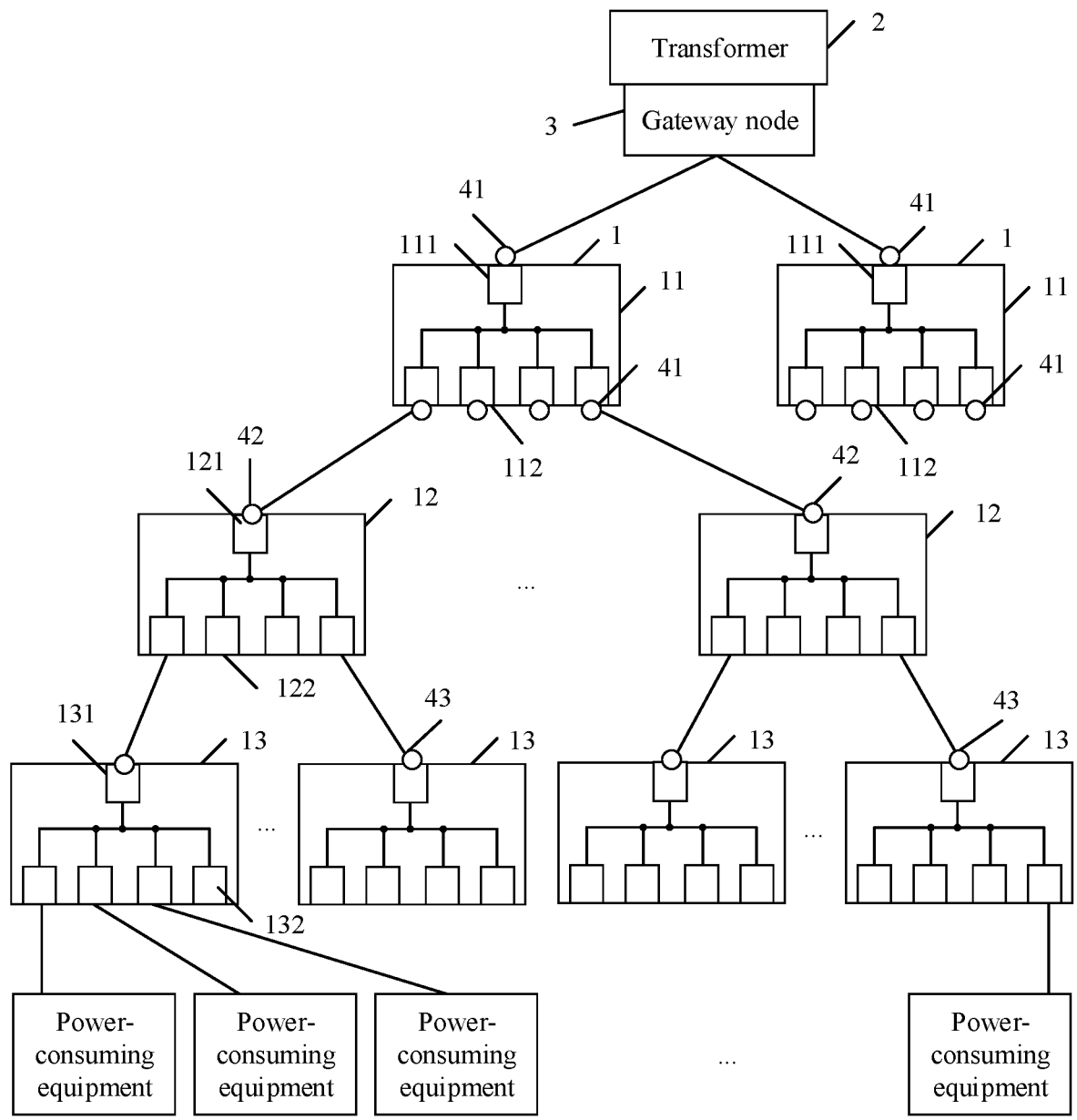
FIG. 6 is a schematic diagram of a structure of another power distribution network according to an embodiment of this application.

Because each power distribution equipment includes one input terminal and a plurality of output terminals, the generated physical network topology diagram can show $i^{th}$-level power distribution equipment and $(i+1)^{th}$-level power distribution equipment connected to the $i^{th}$-level power distribution equipment, where i=1, 2, 3, . . . , but cannot show an output terminal of the $i^{th}$-level power distribution equipment connected to the input terminal of the $(i+1)^{th}$-level power distribution equipment. Refer to FIG. 6. To determine the output terminal of the $i^{th}$-level power distribution equipment connected to the $(i+1)^{th}$-level power distribution equipment, an energy-efficiency collection terminal 5 may be disposed at each output terminal of the first-level power distribution equipment 11 in the power distribution network. For another-level power distribution equipment in the power distribution network other than the first-level power distribution equipment 11, an energy-efficiency collection terminal 5 may be disposed at an input terminal of the power distribution equipment and an energy-efficiency collection terminal 5 may be disposed at each output terminal of the power distribution equipment.

For any power distribution equipment in the power distribution network, an energy-efficiency collection terminal 5 on the power distribution equipment is connected to a node on the power distribution equipment.

Optionally, when the power distribution equipment is provided with one node, each energy-efficiency collection terminal 5 on the power distribution equipment is connected to the node. When an input terminal of the power distribution equipment is provided with a node and each output terminal of the power distribution equipment is provided with a node, the energy-efficiency collection terminal 5 disposed at the input terminal of the power distribution equipment may be connected to the node disposed at the input terminal. For each output terminal of the power distribution equipment, the energy-efficiency collection terminal 5 disposed at the output terminal may be connected to the node disposed at the output terminal.

The gateway node may determine, by using an energy-efficiency collection terminal 5 located at an output terminal of the $i^{th}$-level power distribution equipment and an energy-efficiency collection terminal 5 located at an input terminal of each $(i+1)^{th}$-level power distribution equipment, an output terminal of the $i^{th}$-level power distribution equipment connected to each $(i+1)^{th}$-level power distribution equipment. For a detailed determining process, refer to the embodiment shown in FIG. 12A and FIG. 12B, and details are not described herein.

Figure 7:
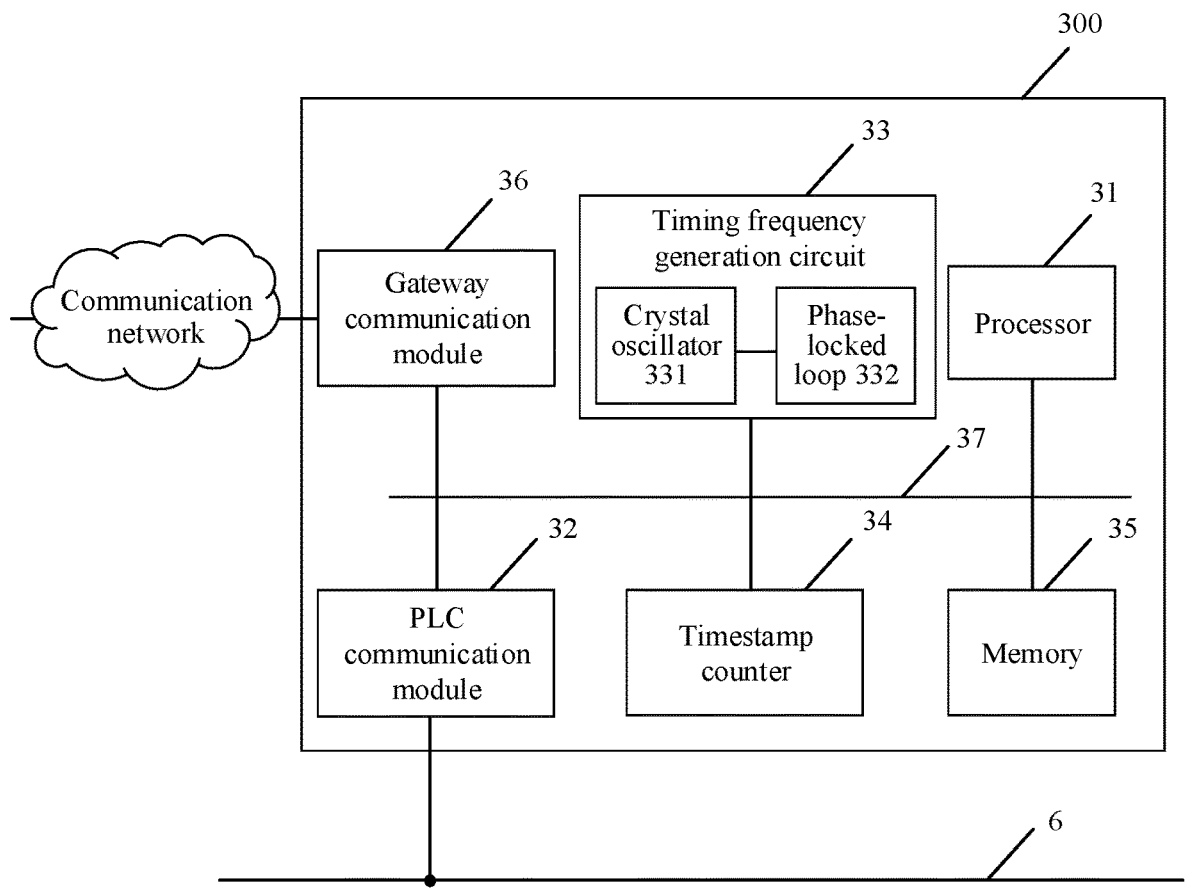
FIG. 7 is a schematic diagram of a structure of a device according to an embodiment of this application.

Refer to FIG. 7. An embodiment of this application provides a device 300. The device may be the gateway node disposed in the foregoing power distribution network, the node located on the power distribution equipment in the power distribution network, the first device located in the foregoing first power substation, the second device located in the foregoing second power substation, or the like. The device includes:

a processor 31, a PLC communication module 32, a timing frequency generation circuit 33, a timestamp counter 34, and a memory 35, where the processor 31, the PLC communication module 32, the timing frequency generation circuit 33, the timestamp counter 34, and the memory 35 may be connected by using a bus 37; and the PLC communication module 42 is connected to a PLC communication network.

The processor 31 may send a packet or receive a packet in the PLC communication network by using the PLC communication module 32. The PLC communication module 32 includes a PLC media access control (MAC) communication module and a physical layer (PHY) communication module, and is responsible for performing framing, modulation, and demodulation on a PLC carrier signal.

The timing frequency generation circuit 33 is configured to generate timing frequency and input the timing frequency to the timestamp counter 34.

Optionally, the timing frequency generation circuit 33 may include a crystal oscillator 311. The crystal oscillator 311 is configured to generate timing frequency. Optionally, the timing frequency generation circuit 33 may further include a phase-locked loop 312.

The timestamp counter 34 is configured to perform counting based on the timing frequency. An interval between two times of consecutive counting performed by the timestamp counter 34 is equal to 1/f, where f is the timing frequency, in other words, a counting cycle of the timestamp counter 34 is 1/f.

For example, if an initial value of the timestamp counter 34 is 0, when the first counting cycle starts, the timestamp counter 44 increases a count value to 1; when the second counting cycle starts, the timestamp counter 34 increases the count value to 2; and when the third counting cycle starts, the timestamp counter 34 increases the count value to 3. The timestamp counter 34 repeats the foregoing process, to be specific, increases the count value by 1 after each counting cycle.

A product of a current count value of the timestamp counter 34 and 1/f is equal to a current timestamp.

Optionally, the timing frequency generated by the timing frequency generation circuit 33 may be equal to nominal timing frequency. The nominal timing frequency may be timing frequency agreed on by the device 300 and another device in the PLC communication network, or may be timing frequency that is set in the device 300 when the device 300 is delivered from the factory.

When hardware performance of the timing frequency generation circuit 33 in the device 300 is high, timing frequency generated by the timing frequency generation circuit 33 at different moments is equal to the nominal timing frequency. For example, the device 300 may be the foregoing gateway node. When generating the physical network topology diagram of the power distribution network, the gateway node needs to obtain timing frequency actually generated by the gateway node. Therefore, the timing frequency generation circuit 33 with high hardware performance may be used in the gateway node, so that the timing frequency actually generated by the gateway node at different moments is equal to the nominal timing frequency. In this way, when generating the physical network topology diagram, the gateway node directly uses the nominal timing frequency as the timing frequency actually generated by the gateway node.

Optionally, the timing frequency generated by the timing frequency generation circuit 33 at different moments may be greater than the nominal timing frequency, may be equal to the nominal timing frequency, or may be less than the nominal timing frequency.

When the hardware performance of the timing frequency generation circuit 33 in the device 300 is not high enough, the timing frequency generated by the timing frequency generation circuit 33 at different moments may be greater than the nominal timing frequency, may be equal to the nominal timing frequency, or may be less than the nominal timing frequency. For example, the device 300 may be the node located in the foregoing power distribution equipment. The node or the gateway node may obtain a frequency offset between the timing frequency of the node and the timing frequency of the gateway node through measurement. The timing frequency actually generated by the node may be obtained based on the timing frequency of the gateway node and the frequency offset. Therefore, hardware performance of a timing frequency generation circuit 33 deployed in the node may be lower than or equal to the hardware performance of the timing frequency generation circuit 33 deployed in the gateway node to reduce costs.

The memory 35 is configured to store a computer program. The computer program may be invoked and executed by the processor 31, so that the processor 31 may measure a data transmission time between the device 300 and another device in the PLC communication network (for example, obtain a data transmission time between the first device located in the foregoing first power substation and the second device located in the foregoing second power substation, or obtain a data transmission time between the foregoing gateway node and the node in the power distribution network, or obtain a data transmission time between the nodes in the foregoing power distribution network) by using the timestamp counter 34 and the PLC communication module 32. For a detailed process in which the processor 31 measures the data transmission time, refer to related content in the embodiment shown in FIG. 8, and details are not described herein.

Optionally, when the device 300 is the gateway node, the device 300 may further include a gateway communication module 36. The gateway communication module 36 may be connected to a communication network, and may establish a network connection to a management terminal of an administrator via the communication network. The gateway communication module 36 includes a transmission control protocol/internet protocol (TCP/IP) network interface and a PLC network interface. The gateway communication module 36 is connected to the communication network through the TCP/IP network interface, and is connected to the PLC communication module 32 through the PLC network interface. The gateway communication module 36 is configured to convert a packet format, to be specific, convert a packet format transmitted in the PLC network into a packet format that can be transmitted in the communication network, or convert a packet format transmitted in the communication network into a packet format that can be transmitted in the PLC network.

Optionally, the PLC communication module 32 may be a chip that implements a PLC communication protocol, for example, a dedicated PLC chip; and may include a module or circuit that implements a PLC MAC communication and a PHY communication, and a module or circuit that performs framing, modulation, and demodulation on a PLC carrier signal.

Optionally, the processor 31 may be a general central processing unit (CPU), a network processor (NP), or a combination of a CPU and an NP. The processor 31 may further include a hardware chip. The hardware chip may be a microcontroller unit (MCU), an application-specific integrated circuit (ASIC), a complex programmable logic device (CPLD), a field-programmable gate array (FPGA), generic array logic (GAL), one or more integrated circuits configured to control execution of programs in this solution, or any combination thereof.

The memory 35 may be, but is not limited to, a random access memory (RAM) or another type of dynamic storage device that can store information and instructions, a disk storage medium or another magnetic storage device, or any other medium that can be configured to carry or store desired program code in a form of instructions or data structures and that can be accessed by a computer. The memory may exist independently, and is connected to a forwarding chip by using a bus. Alternatively, the memory may be integrated with a forwarding chip.

Figure 8:
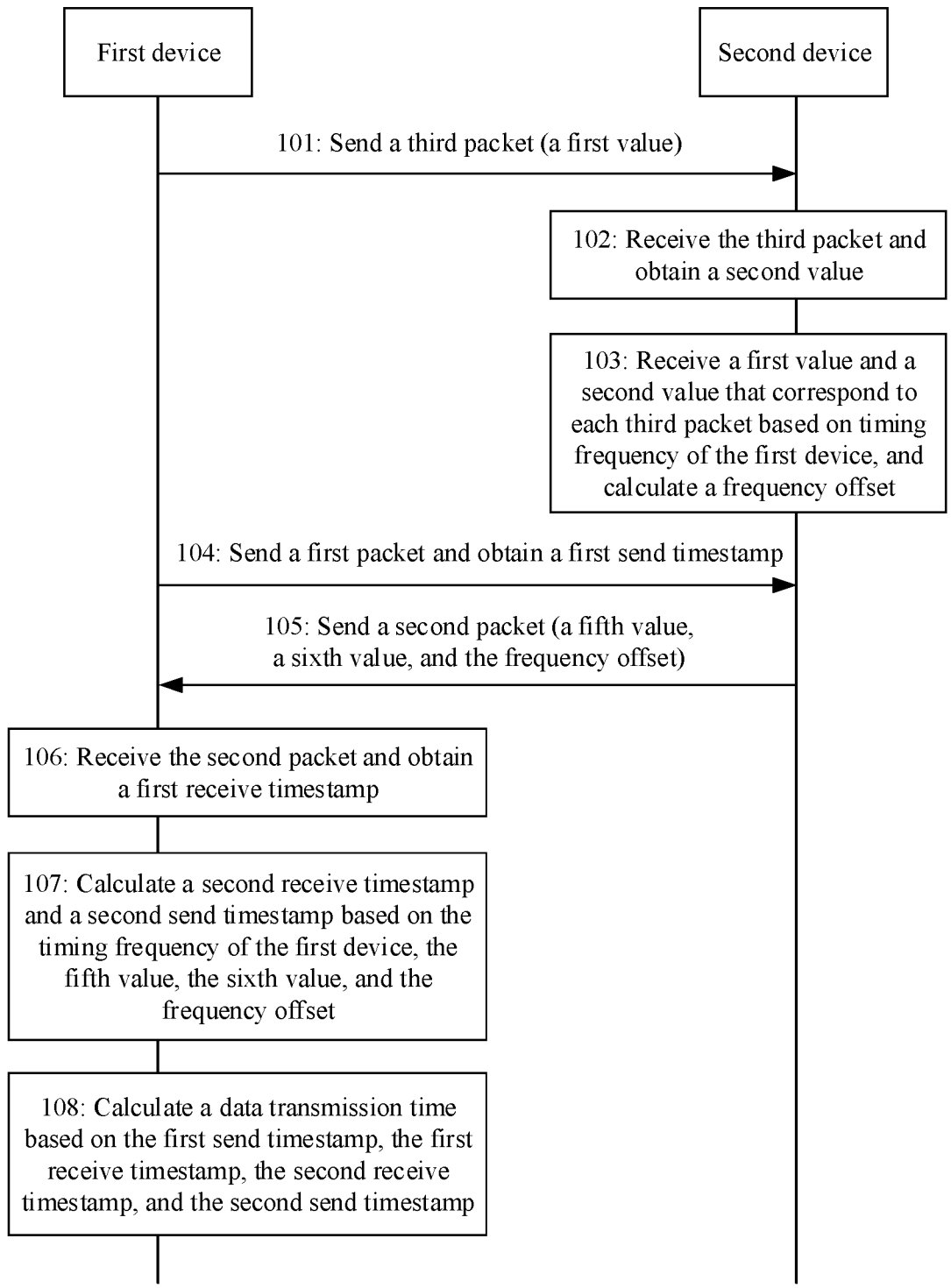
FIG. 8 is a flowchart of a data transmission time obtaining method according to an embodiment of this application.

Refer to FIG. 8. An embodiment of this application provides a data transmission time obtaining method. The method may be applied to a PLC communication network. For example, the method may be applied to the power transmission network shown in FIG. 1, or may be applied to the power distribution network shown in FIG. 4, FIG. 5, or FIG. 6. In a PLC network, a data transmission time between two devices may need to be measured. For ease of description, the two devices are referred to as a first device and a second device. The first device may first obtain a frequency offset between timing frequency of the first device and timing frequency of the second device, and then measure the data transmission time between the first device and the second device based on the frequency offset.

Figure 1:
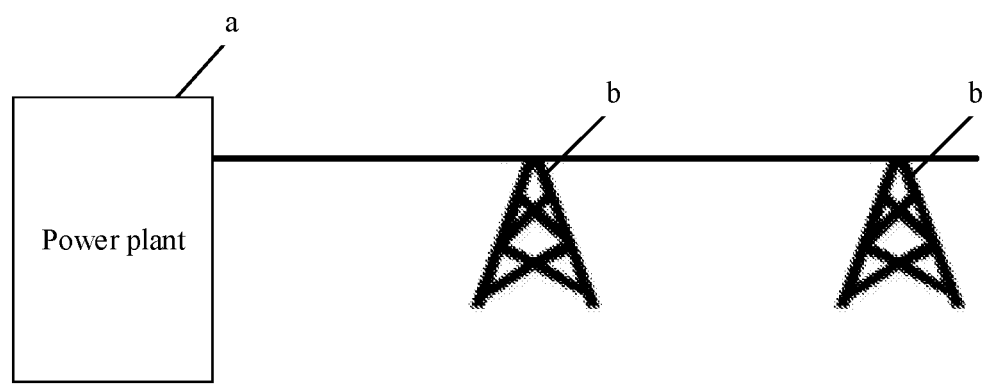
FIG. 1 is a schematic diagram of a structure of a power transmission network according to an embodiment of this application.

Optionally, when the method is applied to the power transmission network shown in FIG. 1, the first device may be the foregoing first device deployed in the first power substation and the second device may be the foregoing second device deployed in the second power substation.

Optionally, when the method is applied to the power distribution networks shown in FIG. 4 to FIG. 6, the first device may be the gateway node in the power distribution network and the second device may be a node on any power distribution equipment in the power distribution network.

As shown in FIG. 8, the method includes the following steps.

Step 101: The first device sends a third packet to the second device, where the third packet includes a first value, and the first value is a value displayed on a timestamp counter of the first device when the first device sends the third packet.

The first device may send n third packets to the second device at different moments, where n is an integer greater than 1. For each third packet, when the first device determines to send the third packet, the first device obtains the value displayed on the timestamp counter of the first device as the first value, and sends the third packet to the second device, where the third packet includes a first value. In other words, each third packet corresponds to one first value.

Optionally, the first device may send n third packets to the second device at different moments within one time window, and a time length of the time window is equal to a first time threshold. In this way, a time difference between a time at which the first device sends the $1^{st}$ third packet and a time at which the first device sends an $n^{th}$ third packet is less than or equal to the first time threshold.

A timing frequency generation circuit of the second device is affected by an environmental factor such as temperature and/or humidity in the environment. Therefore, if the time difference between the time at which the Pt third packet is sent and the time at which the $n^{th}$ third packet is sent is less than or equal to the first time threshold, an impact of the environmental factor on obtaining and calculating the frequency offset between the timing frequency of the first device and the timing frequency of the second device can be reduced.

Optionally, the first device may send the third packets to the second device at even intervals or uneven intervals.

Optionally, refer to the third packet shown in FIG. 9. The third packet includes a destination identifier field, a source identifier field, a send timestamp count value field, and a receive timestamp count value field.

When determining to send an $x^{th}$ third packet, where x=1, 2, ..., or n, the first device reads a current count value from the timestamp counter of the first device as a first value corresponding to the $x^{th}$ third packet, and sends the $x^{th}$ third packet to the second device. A destination identifier field of the $x^{th}$ third packet carries an identifier of the node, a source identifier field of the $x^{th}$ third packet carries an identifier of the gateway node, and a send timestamp count value field of the $x^{th}$ third packet carries the first value corresponding to the $x^{th}$ third packet. In this case, content carried in a receive timestamp count value of the $x^{th}$ third packet field may be empty.

Optionally, in FIG. 9, the $x^{th}$ third packet may further include a measurement sequence number field, and the measurement sequence number field carries x. Alternatively, optionally, a packet sequence number of the $x^{th}$ third packet may be equal to x. In this way, the $x^{th}$ third packet may alternatively not include a measurement sequence number field.

Step 102: The second device receives the third packet and obtains a second value, where the second value is a value displayed on a timestamp counter of the second device when the second device receives the third packet.

The first device sends n third packets to the second device at different moments, and it is assumed that the third device has received the $x^{th}$ third packet. After receiving the $x^{th}$ third packet, the second device determines whether the identifier carried in the destination identifier field of the $x^{th}$ third packet is the same as an identifier of the second device. If the identifier carried in the destination identifier field of the $x^{th}$ third packet is different from the identifier of the second device, the $x^{th}$ third packet is discarded. If the identifier carried in the destination identifier field of the $x^{th}$ third packet is the same as the identifier of the second device, a current count value is read from the timestamp counter of the second device as the second value, and the second value corresponds to the $x^{th}$ third packet.

Optionally, the second device may set that the receive timestamp count value field of the $x^{th}$ third packet carries the second value corresponding to the $x^{th}$ third packet, and stores the $x^{th}$ third packet; or optionally, the second device may not store the $x^{th}$ third packet, but stores a correspondence between the first value and the second value that correspond to the $x^{th}$ third packet.

After receiving a plurality of third packets, the second device obtains a first value and a second value that correspond to each of the plurality of third packets, and then performs the operation of the following 103.

Step 103: The second device calculates the frequency offset between the timing frequency of the first device and the timing frequency of the second device based on the timing frequency of the first device and the first value and the second value that correspond to each received third packet.

Optionally, the second device stores nominal timing frequency, and the second device may use the nominal timing frequency as the timing frequency of the first device.

The nominal timing frequency is timing frequency agreed on by the first device and the second device before this step is performed. Therefore, the first device and the second device store the same nominal timing frequency. Alternatively, the nominal timing frequency is timing frequency that is set in the second device when the second device is delivered from the factory. The nominal timing frequency that is set in the second device is the same as the nominal timing frequency that is set in the first device when the first device is delivered from the factory. In other words, the first device and the second device store the same nominal timing frequency.

The hardware performance of the first device is high, and the timing frequency generated by the first device at different moments is equal to the nominal timing frequency stored in the first device. Therefore, the second device may use the nominal timing frequency stored in the second device as the timing frequency of the first device. The hardware performance of the second device may be lower than the hardware performance of the first device. Consequently, the timing frequency generated by the second device at different moments is different, that is, the timing frequency generated by the second device at different moments may be greater than the nominal timing frequency, may be less than the nominal timing frequency, or may be equal to the nominal timing frequency. Therefore, there is a frequency offset between the timing frequency of the first device and the timing frequency of the second device.

Optionally, the second device may alternatively not store the nominal timing frequency. Before this step is performed, the first device may send the nominal timing frequency stored in the first device to the second device. In this way, in this step, the second device can obtain timing frequency of the first device.

In this step, the second device selects any two third packets from the plurality of received third packets, and it is assumed that the second device has selected an $x^{th}$ third packet and a $y^{th}$ third packet. A frequency offset is calculated according to the following first formula based on the timing frequency of the first device, a first value and a second value that correspond to the $x^{th}$ third packet, and a first value and a second value that correspond to the $y^{th}$ third packet, where x is any integer ranging from 1 to n, and y is any integer, other than x, ranging from 1 to n.

The first formula is: $(T_{1y}-T_{1x})/f=(T_{2y}-T_{2x})/(f+\Delta f)$.

In the first formula, $T_{1y}$ is the first value corresponding to the $y^{th}$ third packet, $T_{1x}$ is the first value corresponding to the $x^{th}$ third packet, f is the timing frequency of the first device, $T_{2y}$ is the second value corresponding to the $y^{th}$ third packet, $T_{2x}$ is the second value corresponding to the $x^{th}$ third packet, and $\Delta f$ is the frequency offset.

In this step, when n=2, a frequency offset is calculated based on a first value and a second value that correspond to each of the two third packets, and the frequency offset is used as a frequency offset between the timing frequency of the first device and the timing frequency of the second device.

When n is greater than 2, two different third packets are selected in the foregoing manner; and each time two third packets are selected, a frequency offset is calculated based on the timing frequency of the first device and a first value and a second value that correspond to each of the two selected third packets. In this way, a plurality of frequency offsets can be calculated. An average value of the plurality of frequency offsets is calculated, and the average value is used as the frequency offset between the timing frequency of the first device and the timing frequency of the second device. In this way, precision of the calculated frequency offset can be improved.

Optionally, when the second device stores n third packets, the second device selects two third packets from the n stored third packets, and extracts, from the two third packets, a first value and a second value that correspond to each third packet. The second device stores a correspondence between a first value and a second value, and selects two records from the correspondence to obtain a first value and a second value that correspond to each of the two third packets; and then, calculates a frequency offset based on the first value and the second value that correspond to the third packet included in each record and the timing frequency of the first device.

For example, in this step, the second device stores then third packets, selects the $1^{st}$ third packet and the $2^{nd}$ third packet, and calculates the Pt frequency offset according to the foregoing first formula based on the time frequency of the first device, a first value and a second value that correspond to the Pt third packet, and a first value and a second value that correspond to the $2^{nd}$ third packet. Then, the second device selects the $2^{nd}$ third packet and the $3^{rd}$ third packet, and calculates the $2^{nd}$ frequency offset according to the foregoing first formula based on the time frequency of the first device, a first value and a second value that correspond to the $2^{nd}$ third packet, and a first value and a second value that correspond to the $3^{rd}$ third packet. The foregoing process is repeated until the second device selects an $(n-1)^{th}$ third packet and an $n^{th}$ third packet, and calculates an $(n-1)^{th}$ frequency offset according to the foregoing first formula based on the timing frequency of the first device, a first value and a second value that correspond to the $(n-1)^{th}$ third packet, and a first value and a second value that correspond to the $n^{th}$ third packet. In this way, the second device obtains n-1 frequency offsets through calculation, calculates an average value based on the n-1 frequency offsets, and uses the average value as the frequency offset between the timing frequency of the first device and the timing frequency of the second device.

Optionally, the frequency offset between the timing frequency of the first device and the timing frequency of the second device may alternatively be obtained by the first device. During implementation, the first device may send a second instruction to the second device. The second device receives the second instruction, and sends n third packets to the first device at different moments. For any third packet, the third packet includes a first value, and the first value is a value displayed on a timestamp counter of the second device when the second device sends the third packet. The first device receives the third packet and obtains a second value, where the second value is a value displayed on the timestamp counter of the first device when the first device receives the third packet. In this way, the first device obtains the first value and the second value that correspond to the third packet. After obtaining first values and second values that correspond to a plurality of third packets, the first device calculates the frequency offset between the timing frequency of the first device and the timing frequency of the second device based on the first value and the second value that correspond to each of the plurality of third packets and the timing frequency of the first device. An implementation process in which the first device calculates the frequency offset is the same as the implementation in which the second device calculates the frequency offset, and details are not described herein again.

After the frequency offset between the timing frequency of the first device and the timing frequency of the second device is calculated, the data transmission time between the first device and the second device may be measured by using the operations of the following 104 to 107.

Step 104: The first device sends a first packet to the second device and obtains a first send timestamp of the first packet.

When sending the first packet to the second device, the first device obtains a value displayed on the timestamp counter of the first device to obtain a third value (represented by $D_3$), and calculates the first send timestamp $T_{s1}=D_3/f$ of the first packet based on the third value $D_3$ and the timing frequency (represented by f) of the first device.

Step 105: The second device receives the first packet and sends a second packet to the first device, where the second packet includes a fifth value and a sixth value and the frequency offset between the timing frequency of the first device and the timing frequency of the second device.

In this step, when receiving the first packet, the second device obtains a value displayed on a timestamp counter of the second device to obtain a fifth value (represented by $D_5$); when determining to send the second packet, obtains a value displayed on the timestamp counter of the second device to obtain a sixth value (represented by $D_6$); and sends the second packet to the first device, where the second packet includes the fifth value $D_5$, the sixth value $D_6$, and the frequency offset (represented by $\Delta f$).

Step 106: The first device receives the second packet sent by the second device and obtains a first receive timestamp of the second packet.

In this step, when receiving the second packet, the first device obtains a value displayed on the timestamp counter of the first device to obtain a fourth value (represented by $D_4$), and calculates the first receive timestamp $T_{r1}=D_4/f$ of the second packet based on the timing frequency f of the first device and the fourth value $D_4$.

Step 107: The first device calculates, based on the timing frequency of the first device, the frequency offset, the fifth value, and the sixth value, a second receive timestamp at which the second device receives the first packet and a second send timestamp at which the second device sends the second packet.

In this step, the first device calculates the timing frequency $f+\Delta f$ of the second device based on the timing frequency f of the first device and the frequency offset $\Delta f$; calculates, based on the timing frequency $f+\Delta f$ of the second device and the fifth value $D_5$, the second receive timestamp $T_{r2}=D_5/(f+\Delta f)$ at which the second device receives the first packet; and calculates, based on the timing frequency $f+\Delta f$ of the second device and the sixth value $D_6$, the second send timestamp $T_{s2}=D_6/(f+\Delta f)$ at which the second device sends the second packet.

Step 108: The first device calculates the data transmission time between the first device and the second device based on the first receive timestamp, the second receive timestamp, the first send timestamp, and the second send timestamp.

The data transmission time between the first device and the second device satisfies $T=(T_{r1}-T_{s1})-(T_{s2}-T_{r2}))/2$.

Optionally, the first device may send a plurality of first packets to the second device, that is, the first device repeats the foregoing steps 104 to 108 to calculate a plurality of data transmission times between the first device and the second device, calculates an average value of the plurality of data transmission times, and uses the average value as a final data transmission time between the first device and the second device.

In this embodiment of this application, the first device sends a plurality of third packets to the second device at different moments. For any third packet, the third packet includes a first value, and the first value is a value displayed on the timestamp counter of the first device when the first device sends the third packet. When receiving the third packet, the second device obtains the value displayed on the timestamp counter of the second device, to obtain a second value. In this way, the second device receives the plurality of third packets, obtains the first value and the second value that correspond to each third packet, and calculates the frequency offset between the timing frequency of the first device and the timing frequency of the second device based on the timing frequency of the first device and the first value and the second value that correspond to each third packet. When measuring the data transmission time between the first device and the second device, the first device sends the first packet to the second device and obtains the first send timestamp of the first packet. The second device receives the first packet and sends the second packet to the first device, where the second packet includes the frequency offset, the fifth value, and the sixth value, the fifth value is a value displayed on the timestamp counter of the second device when the second device receives the first packet, and the sixth value is a value displayed on the timestamp counter of the second device when the second device sends the second packet. The first device receives the second packet; obtains the first receive timestamp of the second packet; calculates the timing frequency of the second device based on the timing frequency of the first device and the frequency offset; calculates, based on the timing frequency of the second device and the fifth value, the second receive timestamp at which the second device receives the first packet; and calculates, based on the timing frequency of the second device and the sixth value, the second send timestamp at which the second device sends the second packet. In this way, accuracy of calculating the second receive timestamp and the second send timestamp can be improved. As such, the data transmission time between the first device and the second device can be accurately calculated based on the first send timestamp, the first receive timestamp, the second send timestamp, and the second receive timestamp. Because the first device can accurately obtain the first send timestamp and the first receive timestamp and accurately obtain the second receive timestamp and the second send timestamp based on the frequency offset between the the timing frequency of first device and the timing frequency of the second device, no separate synchronization circuit needs to be disposed on the first device and the second device for time synchronization, thereby reducing costs.

Refer to FIG. 10. An embodiment of this application provides another data transmission time obtaining method. The method may be applied to a PLC communication network. For example, the method may be applied to the power transmission network shown in FIG. 1, or may be applied to the power distribution network shown in FIG. 4 or FIG. 5. In a PLC network, a data transmission time between two devices may need to be measured. For ease of description, the two devices are referred to as a first device and a second device. The first device controls the second device to synchronize timing frequency of the second device with timing frequency of the first device. Then, the first device measures a data transmission time between the first device and the second device.

Optionally, when the method is applied to the power transmission network shown in FIG. 1, the first device may be the foregoing first device deployed in the first power substation and the second device may be the foregoing second device deployed in the second power substation.

Optionally, when the method is applied to the s shown in FIG. 4 to FIG. 6, the first device may be the gateway node in the power distribution network and the second device may be a node on any power distribution equipment in the power distribution network.

Refer to FIG. 10. The method includes the following steps.

Step 201: The first device sends a sequence signal to the second device, where the sequence signal is determined based on the timing frequency of the first device.

Signal change frequency of the sequence signal may be L times the timing frequency of the first device, where L is a value greater than 0.

Optionally, the sequence signal may be a bit sequence, and the bit sequence includes a first bit value and a second bit value. In the bit sequence, change frequency of the first bit value is L times the timing frequency of the first device.

The first bit value may be a value 0 and the second bit value may be a value 1. Alternatively, the first bit value may be a value 1 and the second bit value may be a value 0.

Step 202: The second device receives the sequence signal and synchronizes the timing frequency of the second device with the timing frequency of the first device based on the sequence signal.

A timing frequency generation circuit of the second device includes a phase-locked loop and a crystal oscillator. The crystal oscillator may generate timing frequency under control of the phase-locked loop. When receiving the sequence signal, the second device inputs the sequence signal to the phase-locked loop. The phase-locked loop may determine the timing frequency of the first device based on the sequence signal, and synchronizes the timing frequency generated by the crystal oscillator of the second device with the timing frequency of the first device.

Step 203: The second device sends a synchronization complete message to the first device.

Step 204: The first device receives the synchronization complete message, sends a first packet to the second device, and obtains a first send timestamp of the first packet.

When sending the first packet to the second device, the first device obtains a value displayed on a timestamp counter of the first device to obtain a third value (represented by $D_3$), and calculates the first send timestamp $T_{s1}=D_3/f$ of the first packet based on the third value $D_3$ and the timing frequency (represented by f) of the first device.

Step 205: The second device receives the first packet and sends a second packet to the first device, where the second packet includes a fifth value and a sixth value.

In this step, when receiving the first packet, the second device obtains a value displayed on a timestamp counter of the second device to obtain a fifth value (represented by $D_5$); when determining to send the second packet, obtains a value displayed on the timestamp counter of the second device to obtain a sixth value (represented by $D_6$); and sends the second packet to the first device, where the second packet includes the fifth value $D_5$ and the sixth value $D_6$.

Step 206: The first device receives the second packet sent by the second device and obtains a first receive timestamp of the second packet.

In this step, when receiving the second packet, the first device obtains a value displayed on the timestamp counter of the first device to obtain a fourth value (represented by $D_4$), and calculates the first receive timestamp $T_{r1}=D_4/f$ of the second packet based on the timing frequency f of the first device and the fourth value $D_4$.

Step 207: The first device calculates, based on the timing frequency of the second device, the fifth value, and the sixth value, a second receive timestamp at which the second device receives the first packet and a second send timestamp at which the second device sends the second packet.

In this step, the first device uses the timing frequency f of the first device as the timing frequency of the second device; calculates, based on the timing frequency f of the second device and the fifth value $D_5$, the second receive timestamp $T_{r2}=D_5/f$ at which the second device receives the first packet; and calculates, based on the timing frequency f of the second device and the sixth value $D_6$, the second send timestamp $T_{s2}=D_6/f$ at which the second device sends the second packet.

Step 208: The first device calculates the data transmission time between the first device and the second device based on the first receive timestamp, the second receive timestamp, the first send timestamp, and the second send timestamp.

The data transmission time between the first device and the second device satisfies $T=((T_{r1}-T_{s1})-(T_{s2}-T_{r2}))/2$.

Optionally, the first device may send a plurality of first packets to the second device, that is, the first device repeats the foregoing steps 204 to 208 to calculate a plurality of data transmission times between the first device and the second device, calculates an average value of the plurality of data transmission times, and uses the average value as a final data transmission time between the first device and the second device.

In this embodiment of this application, the first device controls the second device to synchronize the timing frequency of the second device with the timing frequency of the first device. In this way, the first device may use the timing frequency of the first device as the timing frequency of the second device. When measuring the data transmission time between the first device and the second device, the first device sends the first packet to the second device and obtains the first send timestamp of the first packet. The second device receives the first packet and sends the second packet to the first device, where the second packet includes the fifth value and the sixth value, the fifth value is a value displayed on the timestamp counter of the second device when the second device receives the first packet, and the sixth value is a value displayed on the timestamp counter of the second device when the second device sends the second packet. The first device receives the second packet; obtains the first receive timestamp of the second packet; calculates, based on the timing frequency of the second device and the fifth value, the second receive timestamp at which the second device receives the first packet; and calculates, based on the timing frequency of the second device and the sixth value, the second send timestamp at which the second device sends the second packet. In this way, accuracy of calculating the second receive timestamp and the second send timestamp can be improved. As such, the data transmission time between the first device and the second device can be accurately calculated based on the first send timestamp, the first receive timestamp, the second send timestamp, and the second receive timestamp. Because the first device can accurately obtain the first send timestamp and the first receive timestamp and accurately obtain the second receive timestamp and the second send timestamp based on the frequency offset between the first device and the second device, no separate synchronization circuit needs to be disposed on the first device and the second device for time synchronization, thereby reducing costs.

Figure 11:
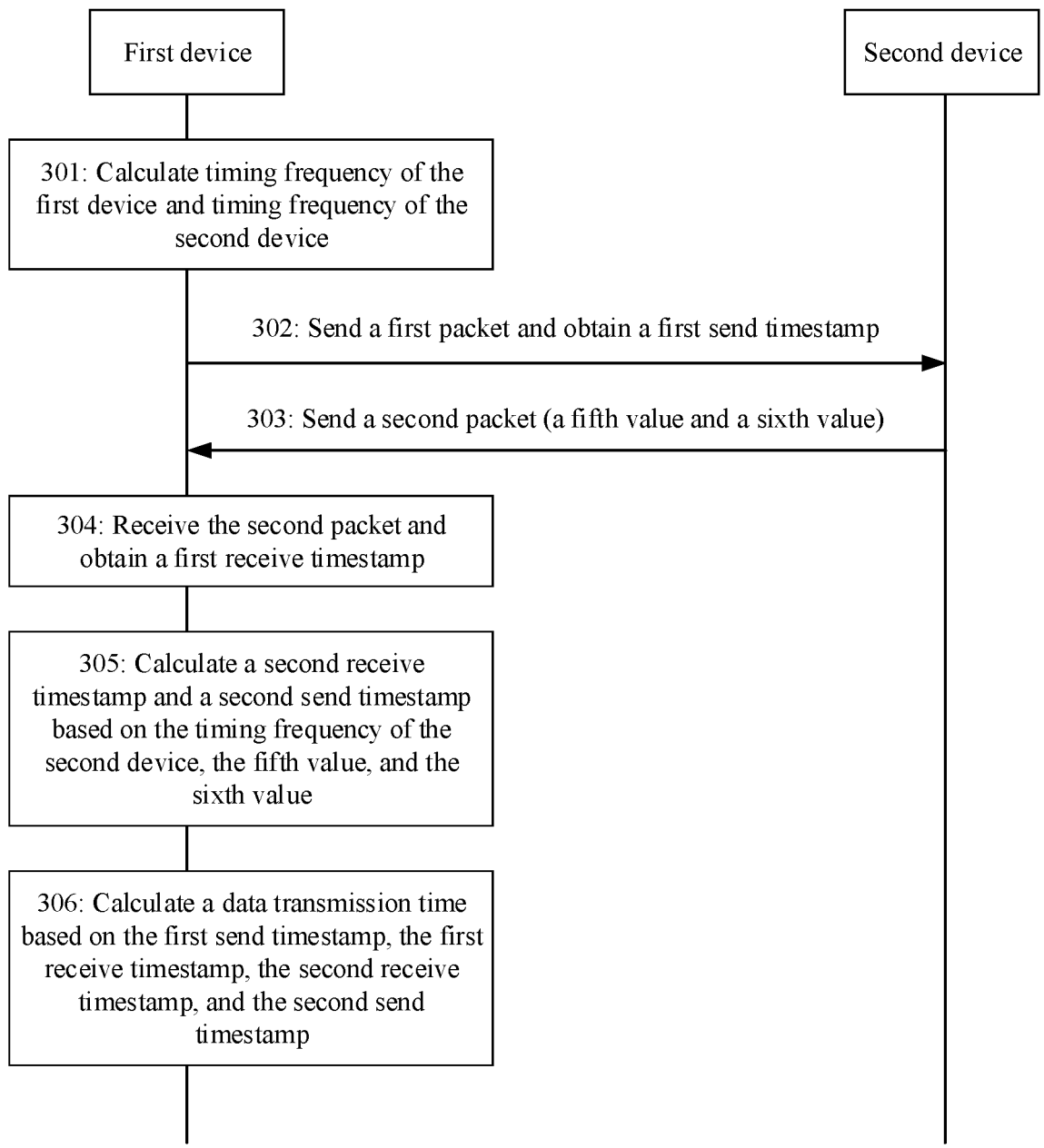
FIG. 11 is a flowchart of another data transmission time obtaining method according to an embodiment of this application.

Refer to FIG. 11. An embodiment of this application provides still another data transmission time obtaining method. The method may be applied to a PLC communication network. In a PLC network, a data transmission time between two devices may need to be measured. For ease of description, the two devices are referred to as a first device and a second device. A third device may include a frequency offset between timing frequency of the third device and timing frequency of the first device and a frequency offset between the timing frequency of the third device and timing frequency of the second device. The third device is a device other than the first device and the second device in the PLC communication network. Then, the third device may send the two frequency offsets to the first device to control the first device to measure the data transmission time between the first device and the second device.

For example, the method may be applied to the power distribution networks shown in FIG. 4 to FIG. 6. In the method, the first device may be a node on power distribution equipment in the power distribution network, the second device may be a node on another power distribution equipment in the power distribution network, and the third device may be a gateway node. When generating a physical network topology diagram of the power distribution network, the gateway node first obtains a frequency offset between timing frequency of the gateway node and timing frequency of a node on each power distribution equipment in the power distribution network by using the method shown in FIG. 8. That is, the gateway node includes a frequency offset between the timing frequency of the gateway node and the timing frequency of the first device and a frequency offset between the timing frequency of the gateway node and the timing frequency of the second device. When requiring the data transmission time between the first device and the second device, the gateway node may control the first device to measure the data transmission time between the first device and the second device.

Refer to FIG. 11. The method includes the following steps.

Step 301: The first device calculates the timing frequency of the first device based on the timing frequency of the third device and the frequency offset between the timing frequency of the third device and the timing frequency of the first device, and calculates the timing frequency of the second device based on the timing frequency of the third device and the frequency offset between the timing frequency of the third device and the timing frequency of the second device.

The first device may receive a measurement request sent by the third device, where the measurement request includes the frequency offset between the timing frequency of the third device and the timing frequency of the first device and the frequency offset between the timing frequency of the third device and the timing frequency of the second device.

Before performing this step, the first device may store the timing frequency of the third device, or the measurement request may further include the timing frequency of the third device. In this way, the first device starts performing this step after receiving the measurement request.

For example, it is assumed that the first device is a node on power distribution equipment in the power distribution network, the second device is a node on another power distribution equipment in the power distribution network, and the third device is a gateway node. When the power distribution network is constructed, the first device and the gateway node agree on nominal timing frequency, and the nominal timing frequency is equal to the timing frequency of the gateway node. Alternatively, the nominal timing frequency is set in the first device when the first device is delivered from the factory.

Step 302: The first device sends a first packet to the node and obtains a first send timestamp of the first packet.

When sending the first packet to the second device, the first device obtains a value displayed on a timestamp counter of the first device to obtain a third value (represented by $D_3$), and calculates the first send timestamp $T_{s1}=D_3/f$ of the first packet based on the third value $D_3$ and the timing frequency (represented by f) of the first device.

Steps 303 to 306 are respectively the same as steps 205 to 208, and are not described in detail herein.

In this embodiment of this application, the first device obtains the timing frequency of the first device and the timing frequency of the second device. When measuring the data transmission time between the first device and the second device, the first device can accurately calculate the data transmission time between the first device and the second device based on the timing frequency of the first device and the timing frequency of the second device and by using a packet. In this way, no separate synchronization circuit needs to be disposed on the first device and the second device for time synchronization, thereby reducing costs.

Figure 12A:
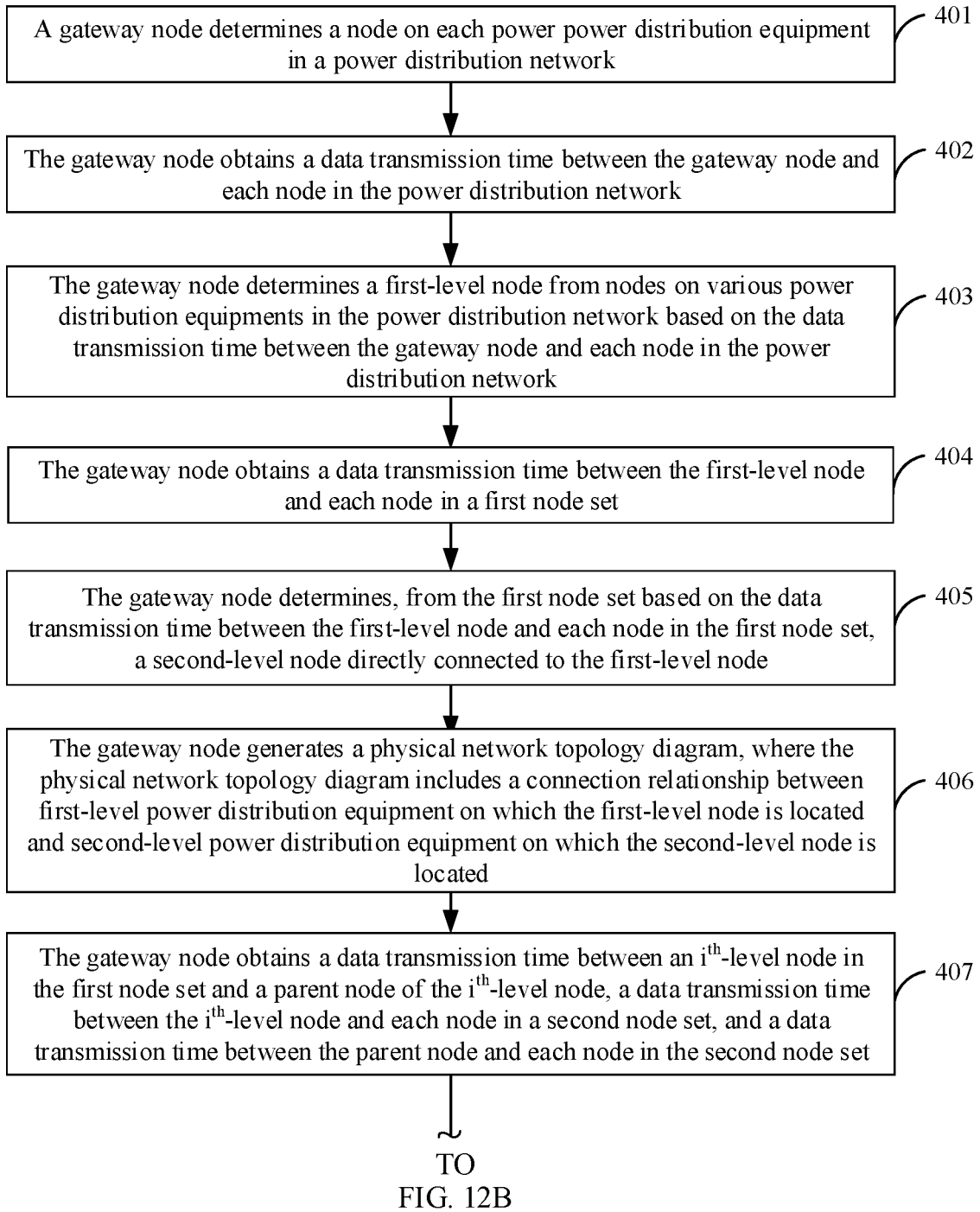
FIG. 12A and FIG. 12B are a flowchart of a physical network topology diagram generation method according to an embodiment of this application.
Figure 12B:
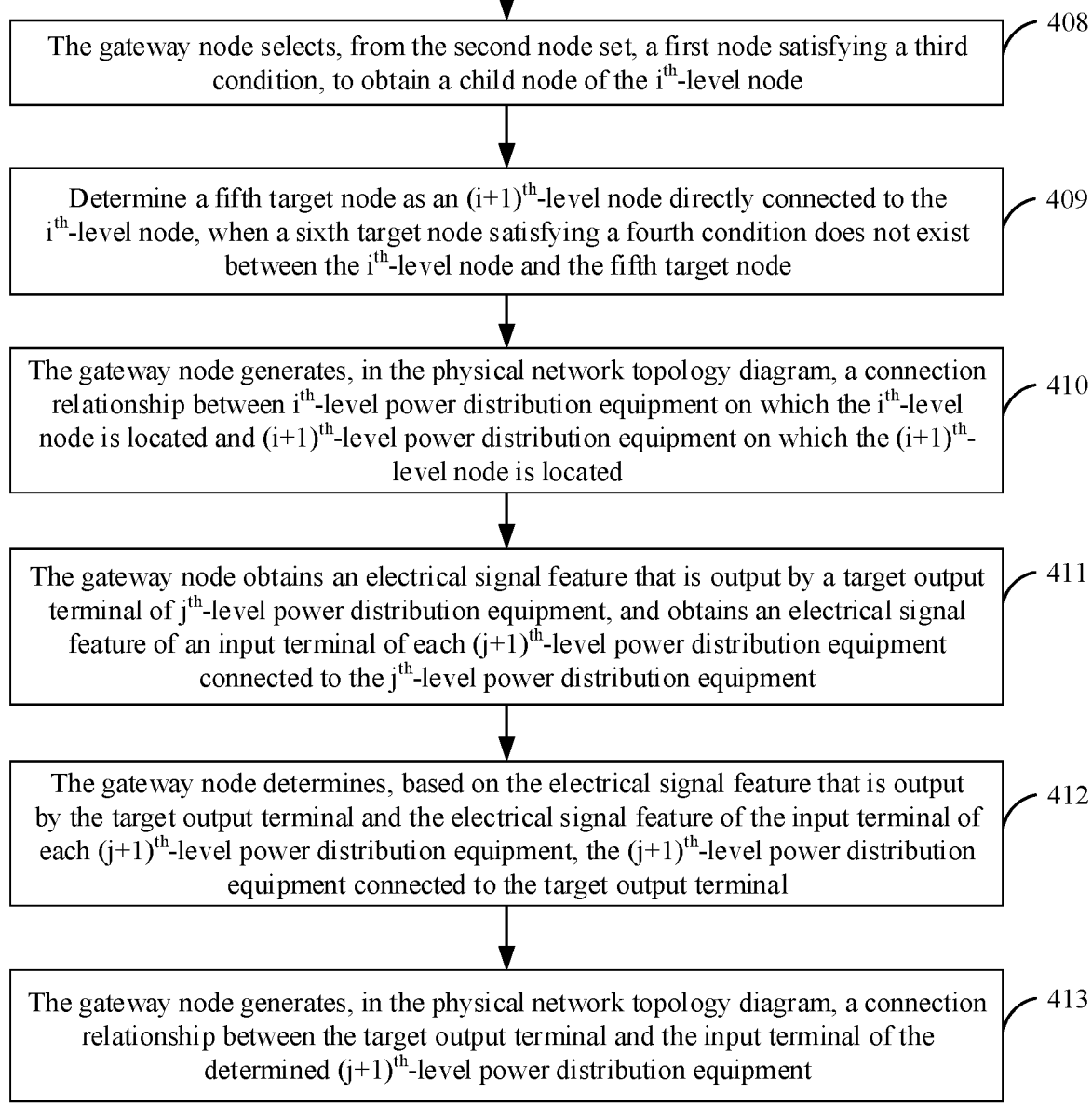

Refer to FIG. 12A and FIG. 12B. An embodiment of this application provides a physical network topology diagram generation method. The method may be applied to any power distribution network shown in FIG. 4 to FIG. 6 to generate a physical network topology diagram of the power distribution network. In a process of generating the physical network topology diagram, a data transmission time needs to be measured by using the method in the embodiment shown in FIG. 8, FIG. 10, or FIG. 12A and FIG. 12B, and the physical network topology diagram is generated based on the measured data transmission time. The physical network topology diagram generation method includes the following steps.

Step 401: A gateway node determines a node on each power distribution equipment in the power distribution network.

Step 402: The gateway node obtains a data transmission parameter between the gateway node and each node in the power distribution network, where the data transmission parameter may be a data transmission time.

Optionally, the data transmission parameter may alternatively be a data transmission distance, and the data transmission distance is calculated based on the data transmission time and a data transmission speed. That is, in this embodiment of this application, the physical network topology diagram may be generated by using the data transmission time, or the physical network topology diagram may be generated by using the data transmission distance. In an example in which the physical network topology diagram is generated by using the data transmission distance, the data transmission distance first needs to be calculated based on the obtained data transmission time and the obtained data transmission speed.

In this embodiment of this application, an example in which the physical network topology diagram is generated by using the data transmission time is used for description. An example in which the physical network topology diagram is generated by using the data transmission distance can be obtained only by replacing the data transmission time in this embodiment of this application with the data transmission distance.

Step 403: The gateway node determines a first-level node from nodes on various power distribution equipments in the power distribution network based on the data transmission time between the gateway node and each node in the power distribution network.

Step 404: The gateway node obtains a data transmission time between the first-level node and each node in a first node set.

Step 405: The gateway node determines, from the first node set based on the data transmission time between the first-level node and each node in the first node set, a second-level node directly connected to the first-level node.

Step 406: The gateway node generates a physical network topology diagram, where the physical network topology diagram includes a connection relationship between first-level power distribution equipment on which the first-level node is located and second-level power distribution equipment on which the second-level node is located.

Step 407: The gateway node obtains a data transmission time between an $i^{th}$-level node in the first node set and a parent node of the $i^{th}$-level node, a data transmission time between the $i^{th}$-level node and each node in a second node set, and a data transmission time between the parent node and each node in the second node set, where i=2, 3, . . . , and the second node set includes a node located on each level of power distribution equipment after the $i^{th}$-level power distribution equipment.

Step 408: The gateway node selects, from the second node set, a first node satisfying a third condition, to obtain a child node of the $i^{th}$-level node.

Step 409: Determine a fifth target node as an $(i+1)^{th}$-level node directly connected to the $i^{th}$-level node, when a sixth target node satisfying a fourth condition does not exist between the $i^{th}$-level node and the fifth target node.

Step 410: The gateway node generates, in the physical network topology diagram, a connection relationship between the $i^{th}$-level power distribution equipment on which the $i^{th}$-level node is located and $(i+1)^{th}$-level power distribution equipment on which the $(i+1)^{th}$-level node is located; and repeats the foregoing process of steps 407 to 410 until various levels of power distribution equipments and a connection relationship between the various levels of power distribution equipments in the power distribution network are determined.

Step 411: The gateway node obtains an electrical signal feature that is output by a target output terminal of $j^{th}$-level power distribution equipment, and obtains an electrical signal feature of an input terminal of each $(j+1)^{th}$-level power distribution equipment connected to the $j^{th}$-level power distribution equipment, where the target output terminal is any output terminal of the $j^{th}$-level power distribution equipment.

Step 412: The gateway node determines, based on the electrical signal feature that is output by the target output terminal and the electrical signal feature of the input terminal of each $(j+1)^{th}$-level power distribution equipment, the $(j+1)^{th}$-level power distribution equipment connected to the target output terminal.

Step 413: The gateway node generates, in the physical network topology diagram, a connection relationship between the target output terminal and the input terminal of the determined $(j+1)^{th}$-level power distribution equipment.

The gateway node repeats steps 411 to 413 until $(j+1)^{th}$-level power distribution equipments connected to all output terminals of the $j^{th}$-level power distribution equipment are determined; and generates, in the physical network topology diagram, the connection relationship between an output terminal of the $j^{th}$-level power distribution equipment and the input terminal of the $(j+1)^{th}$-level power distribution equipment connected to the output terminal.

In step 401, optionally, when an administrator requires generation of the physical network topology diagram of the power distribution network, a management terminal corresponding to the administrator may send a generation instruction to the gateway node via a communication network. The gateway node receives the generation instruction, and then performs the procedure of generating the physical network topology diagram of the power distribution network. Certainly, there may be no instruction generated, the gateway node automatically performs the procedure of generating the physical network topology diagram of the power distribution network after construction of the power distribution network is completed and the gateway node is powered on for the first time.

In step 401, the gateway node may broadcast the first instruction in the power distribution network. For a node on each power distribution equipment in the power distribution network, the node receives the first instruction and sends a notification packet to the gateway node. The notification packet includes an identifier of the node and basic information about the power distribution equipment on which the node is located. The gateway node receives the identifier of the node and the basic information about the power distribution equipment on which the node is located; and stores, in a node list, a correspondence between the identifier of the node and the basic information about the power distribution equipment on which the node is located. An identifier of each node and basic information about power distribution equipment on which each node is located are correspondingly stored in the node list, so that a node on each power distribution equipment in the power distribution network can be determined.

Optionally, an identifier of a node may be an address of the node, for example, may be a MAC address or an IP address of the node.

For power distribution equipment in the power distribution network, the power distribution equipment may be provided with one or more nodes. When the power distribution equipment is provided one node, a notification packet sent by the node to the gateway node includes an identifier of the node and the basic information about the power distribution equipment.

When the power distribution equipment is provided with a plurality of nodes, a notification packet sent by any node on the power distribution equipment to the gateway node includes an identifier of the node, an identifier of a port at which the node is located, and the basic information about the power distribution equipment. The port is an input terminal or an output terminal of the power distribution equipment. The gateway node receives notification packets from the plurality of nodes on the power distribution equipment. Because identifiers of the power distribution equipment that are sent by the plurality of nodes on the power distribution equipment are the same, the gateway node determines, based on the identifiers of the power distribution equipment that are sent by the plurality of nodes, that the plurality of nodes are located on the same power distribution equipment, may select one node from the plurality of nodes, and correspondingly store an identifier of the selected node and the basic information about the power distribution equipment in the node list.

Optionally, the gateway node may randomly select one node from the plurality of nodes, or select the node located at the input terminal of the power distribution equipment, and store a correspondence between the identifier of the selected node and the basic information about the power distribution equipment in the node list.

When the power distribution equipment is provided with a plurality of nodes, the gateway node further stores an identifier of each node, an identifier of a port at which each node is located, and the identifier of the power distribution equipment in a correspondence between the identifier of the node, the identifier of the port, and the identifier of the power distribution equipment.

Figure 13:
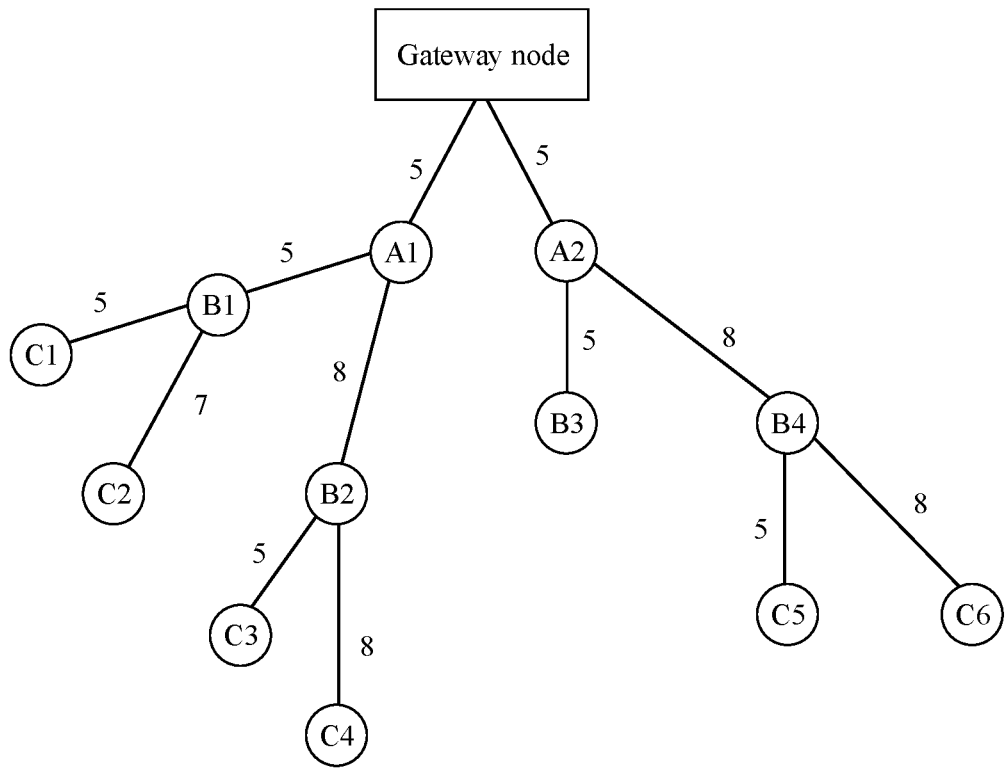
FIG. 13 is a schematic diagram of a structure of another power distribution network according to an embodiment of this application.

For example, as shown in FIG. 13, the gateway node sends a first instruction in the power distribution network. For a node A1, the node A1 receives the first instruction and sends a notification packet to the gateway node. The notification packet includes an identifier Node-A1 of the node A1 and basic information 11 about power distribution equipment 11 (not shown in FIG. 13) on which the node A1 is located. The basic information 11 includes an identifier ID11 and a position P11 of the power distribution equipment 11 on which the node A1 is located. The identifier Node-A1 and the basic information 11 of the node A1 are correspondingly stored in the node list shown in the following Table 1. The gateway node continues to receive a notification packet from another node, and correspondingly stores an identifier of the node in the notification packet and the basic information about the power distribution equipment in the node list shown in the following Table 1. After the gateway node receives notification packets sent by all nodes in the power distribution network, the obtained node list includes identifiers of all the nodes in the power distribution network, in other words, nodes of all power distribution equipments in the power distribution network are determined.

TABLE 1

| Identifier of a node | Basic information about power distribution equipment |
|---|---|
| Node-A1 | Basic information 11 (the identifier ID11 and the position P11 of the power distribution equipment 11) |
| Node-A2 | Basic information 12 (the identifier ID12 and the position P12 of the power distribution equipment 12) |
| . . . | . . . |

In step 402, the gateway node obtains a data transmission time between the gateway node and each node in the power distribution network.

Specifically, a data transmission time between the gateway node and a node includes a data transmission distance or a time of transmitting data between the gateway node and the node.

The gateway node may select an identifier of a node from the node list. For the node corresponding to the identifier of the node, a data transmission time between the gateway node and the node is obtained.

The gateway node may obtain the data transmission time by using the method in the embodiment shown in FIG. 8 or FIG. 9. When the method in the embodiment shown in FIG. 8 or FIG. 9 is used, the gateway node is used as the first device and the node is used as the second device; and then, the gateway node obtains the data transmission time by using the method.

It should be noted that after this step, the gateway node obtains a frequency offset between timing frequency of the gateway node and timing frequency of each node in the power distribution network.

In step 403, the gateway node determines the first-level node from the nodes on the various power distribution equipments in the power distribution network based on the data transmission time between the gateway node and each node in the power distribution network.

Optionally, when a fourth target node that satisfies a second condition does not exist between the gateway node and a third target node, the third target node is determined as the first-level node directly connected to the gateway node. The third target node is any node in the power distribution network. The fourth target node is a node other than the third target node in the power distribution network. The second condition is that a fourth data transmission time is equal to a sum of a fifth data transmission time and a sixth data transmission time. The fourth data transmission time is a data transmission time between the gateway node and the third target node. The fifth data transmission time is a data transmission time between the gateway node and the fourth target node. The sixth data transmission time is a data transmission time between the fourth target node and the third target node.

Specifically, step 403 may be implemented by using the following operations of 4031 to 4036, and the operations of 4031 to 4036 are as follows:

4031: The gateway node selects one node from nodes in the power distribution network as the third target node, and selects another node as the fourth target node.

For example, as shown in FIG. 13, the gateway node selects the node A1 from the power distribution network as the third target node, and selects the node A2 as the fourth target node.

4032: The gateway node obtains the sixth data transmission time between the third target node and the fourth target node.

In this step, the gateway node may send a measurement request to the third target node in the power distribution network. The measurement request includes a frequency offset between the timing frequency of the gateway node and timing frequency of the third target node, a frequency offset between the timing frequency of the gateway node and timing frequency of the fourth target node, and an identifier of the fourth target node. The third target node receives the measurement request, obtains the sixth data transmission time between the third target node and the fourth target node, and sends a measurement response to the gateway node, where the measurement response carries the sixth data transmission time. The gateway node receives the measurement response, and reads the sixth data transmission time between the third target node and the fourth target node from the measurement response.

Optionally, after receiving the measurement request, the third target node may obtain the data transmission time by using the method in the embodiment shown in FIG. 11. When the method in the embodiment shown in FIG. 11 is used, the third target node is used as the first device and the fourth target node is used as the second device; and then, the third target node obtains the data transmission time between the third target node and the fourth target node by using the method.

4033: The gateway node determines whether the fourth data transmission time between the gateway node and the third target node, the fifth data transmission time between the gateway node and the fourth target node, and the sixth data transmission time between the fourth target node and the third target node satisfy the second condition; and if the fourth data transmission time, the fifth data transmission time, and the sixth data transmission time do not satisfy the second condition, performs 4034; or if the fourth data transmission time, the fifth data transmission time, and the sixth data transmission time satisfy the second condition, performs 4036.

The fourth data transmission time is the data transmission time that is between the gateway node and the third target node and that is obtained in step 402. The fifth data transmission time is the data transmission time that is between the gateway node and the fourth target node and that is obtained in step 402.

For example, as shown in FIG. 13, the fourth data transmission time between the gateway node and the third target node A1 is 5, the fifth data transmission time between the gateway node and the fourth target node A2 is 5, and the sixth data transmission time between the fourth target node A2 and the third target node A1 is 10. It is determined that the fourth data transmission time 5 is not equal to the sum of the fifth data transmission time 5 and the sixth data transmission time 10, and 4034 is performed.

4034: The gateway node determines whether nodes that are not selected as the fourth target node exist among nodes other than the third target node in the power distribution network; and if such nodes exist, selects a node from the nodes that are not selected as the fourth target node as the fourth target node, and returns to 4032; or if such nodes do not exist, performs 4035.

For example, as shown in FIG. 13, the gateway node selects a node B1 as the fourth target node from nodes, other than the third target node A1, that are not selected as the fourth target node; and obtains that the sixth data transmission time between the first target node A1 and the fourth target node B1 is 5 and the fifth data transmission time between the gateway node and the fourth target node B1 is 10. It is determined that the fourth data transmission time 5 is not equal to the sum of the fifth data transmission time 10 and the sixth data transmission time 5. The foregoing process is repeated. If the fourth target node that satisfies the second condition has not been determined after all nodes other than the third target node A1 in the power distribution network are selected, the following 4035 is performed.

4035: The gateway node uses the third target node as a first-level node directly connected to the gateway node, and performs 4036.

For example, the third target node A1 is used as a first-level node directly connected to the gateway node.

4036: The gateway node determines whether nodes that are not selected as the third target node exist in the power distribution network; and if such nodes exist, selects one node from the nodes that are not selected as the third target node as the third target node, selects one node from nodes other than the third target node in the power distribution network as the fourth target node, and returns to 4032; or if such nodes do not exist, stops returning.

For example, as shown in FIG. 13, the gateway node selects a node A2 from nodes that are not selected as the third target node as the third target node, and selects a node B1 from nodes other than the third target node A2 in the power distribution network as the fourth target node; and then, returns to step 4032, and determines that the third target node A2 is also a first-level node directly connected to the gateway node. Next, the gateway node continues to select the node B1 from the nodes that are not selected as the third target node as the third target node and select a node B2 from nodes other than the third target node B1 in the power distribution network as the fourth target node, then returns to step 4032. The foregoing process is repeated until no node that is not selected as the third target node exists in the power distribution network. In the example shown in FIG. 13, the first-level node A1 and the second-level node A2 are finally determined after the foregoing process.

Optionally, steps 402 and 403 are optional steps. That is, the gateway node may determine the first-level node in another manner. For example, when the first-level node located on the first-level power distribution equipment sends a notification packet to the gateway node, the notification packet may carry an identity of the first-level node. In this way, the gateway node can determine the first-level node based on the identity of the first-level node in the notification packet.

Optionally, when the power distribution network includes one first-level power distribution equipment, the gateway node selects, from nodes in the power distribution network, a node with a shortest data transmission time between the node and the gateway node as a first-level node.

In step 404, the gateway node obtains the data transmission time between the first-level node and each node in the first node set.

Specifically, when the power distribution network includes one first-level power distribution equipment, the first node set includes a node on another-level power distribution equipment other than the first-level power distribution equipment in the power distribution network, and a node included in the first node set is a child node of the first-level node. When the power distribution network includes a plurality of first-level power distribution equipments, the first node set may include a child node of the first-level node.

The gateway node sends a measurement request to the first-level node in the power distribution network. The measurement request includes an identifier of each node in the first node set, a frequency offset between timing frequency of the gateway node and timing frequency of the first-level node, and a frequency offset between the timing frequency of the gateway node and timing frequency of each node in the first node set. The first-level node receives the measurement request; and for the identifier of each node carried in the measurement request, obtains a data transmission time between the first-level node and the node that corresponds to the identifier of the node. Optionally, the data transmission time may be obtained by using the method in the embodiment shown in FIG. 11. When the method in the embodiment shown in FIG. 11 is used, the first-level node is used as the first device and the node corresponding to the identifier of the node is used as the second device; and then, the first-level node obtains the data transmission time by using the method. After obtaining the data transmission time between the first-level node and each node, the first-level node sends a measurement response to the gateway node. The measurement response carries the data transmission time between the first-level node and each node. The gateway node receives the measurement response, and reads the data transmission time between the first-level node and each node from the measurement response.

When the power distribution network includes a plurality of first-level power distribution equipments, that is, a plurality of first-level nodes are determined in step 403, for each first-level node, the gateway node may further determine, from the nodes in the power distribution network, a child node belonging to the first-level node.

Any node located after the first-level node in the power distribution network is referred to as a first node. When the first node satisfies the following fifth condition, the first node is the child node of the first-level node. The fifth condition is that a thirteenth data transmission time is equal to a difference between a fourteenth signal and a fifteenth data transmission time. The thirteenth data transmission time is a data transmission time between the first-level node and the first node. The fourteenth data transmission time is a data transmission time between the gateway node and the first node. The fifteenth data transmission time is a data transmission time between the gateway node and the first-level node.

During implementation, the child node belonging to the first-level node may be determined through operations of the following 4041 to 4045. The operations of 4041 to 4045 are as follows:

4041: The gateway node obtains the data transmission time between the first-level node and each node in the third node set, where the third node set includes nodes on various levels of power distribution equipments after the first-level power distribution equipment.

The gateway node sends a measurement request to the first-level node in the power distribution network, where the measurement request carries an identifier of each node in the third node set, the frequency offset between the timing frequency of the gateway node and the timing frequency of the first-level node, and the frequency offset between the timing frequency of the gateway node and the timing frequency of each node in the third node set. The first-level node receives the measurement request; and for the identifier of each node in the third node set carried in the measurement request, obtains a data transmission time between the first-level node and the node that corresponds to the identifier of the node. Optionally, the data transmission time may be obtained by using the method in the embodiment shown in FIG. 11. When the method in the embodiment shown in FIG. 11 is used, the first-level node is used as the first device and the node corresponding to the identifier of the node is used as the second device; and then, the first-level node obtains the data transmission time by using the method. After obtaining the data transmission time between the first-level node and each node in the third node set, the first-level node sends a measurement response to the gateway node. The measurement response carries the data transmission time between the first-level node and each node in the third node set. The gateway node receives the measurement response, and reads the data transmission time between the first-level node and each node in the third node set from the measurement response.

For example, as shown in FIG. 13, the first-level nodes A1 and A2 are determined, so that the third node set includes nodes on the various levels of power distribution equipments after the first-level power distribution equipment, to be specific, the third node set includes nodes B1, B2, B3, B4, C1, C2, C3, C4, C5, and C6.

For the first-level node A1, the gateway node obtains a data transmission time between the first-level node A1 and each of the nodes B1, B2, B3, B4, C1, C2, C3, C4, C5, and C6.

4045: The gateway node selects one node from the third node set as a second node.

4043: The gateway node determines whether the thirteenth data transmission time between the first-level node and the second node, the fourteenth data transmission time between the gateway node and the first node, and the fifteenth data transmission time between the gateway node and the first-level node satisfy the foregoing fifth condition.

4044: If the fifth condition is satisfied, use the first node as the child node of the first-level node; and when there still are unselected nodes in the third node set, select one node from the unselected nodes as the first node, and return to 4043.

For example, the gateway node selects the node B1 as the first node. The thirteenth data transmission time between the first-level node A1 and the first node B1 is 5. The fourteenth data transmission time between the gateway node and the first node B1 is 10. The fifteenth data transmission time between the gateway node and the first-level node A1 is 5. The thirteenth data transmission time 5 is equal to a difference between the fourteenth data transmission time 10 and the fifteenth data transmission time 5. Therefore, the first node B1 is a child node of the first-level node A1.

The gateway node selects the node B2 from the unselected nodes B2, B3, B4, C1, C2, C3, C4, C5, and C6 in the third node set as the second node. The foregoing process is repeated, and it is determined that the second node B2 is also a child node of the first-level node A1.

The gateway node selects the node B3 from the unselected nodes B3, B4, C1, C2, C3, C4, C5, and C6 in the third node set as the first node. The thirteenth data transmission time between the first-level node A1 and the first node B3 is 15. The fourteenth data transmission time between the gateway node and the first node B3 is 10. The fifteenth data transmission time between the gateway node and the first-level node A1 is 5. The thirteenth data transmission time 15 is not equal to a difference between the fourteenth data transmission time 10 and the fifteenth data transmission time 5, that is, does not satisfy the foregoing fifth condition. Therefore, the first node B3 is not a child node of the first-level node A1.

4045: If the fifth condition is not satisfied, when there still are unselected nodes in the third node set, select one node from the unselected nodes as the first node, and return to 4043.

If all nodes in the third node set are selected, returning ends.

For example, if there still are unselected nodes B4, C1, C2, C3, C4, C5, and C6 in the third node set, the gateway node continues to repeat the foregoing process until all nodes in the third node set are selected, and it is determined that child nodes of the first-level node A1 include the nodes B1, B2, C1, C2, C3, and C4.

For the first-level node A2, the gateway node also repeats the foregoing process, and determines that child nodes of the first-level node A2 include the nodes B3, B4, C5, and C6.

The gateway node has obtained the data transmission time between the first-level node and each node in the third node set in the operation of 4041. Therefore, when it is determined that the child nodes of the first-level node are included, that is, after the first node set of the first-level node is determined, the data transmission time between the first-level node and each node in the first node set already exists.

In step 405, the gateway node determines, from the first node set based on the data transmission time between the first-level node and each node in the first node set, the second-level node directly connected to the first-level node.

Specifically, when a second target node that satisfies a first condition does not exist between the first-level node and a first target node, the first target node is determined as a second-level node directly connected to the first-level node. The first target node is any node in the first node set. The second target node is another node other than the first target node in the first node set. The first condition is that a first data transmission time is equal to a sum of a second data transmission time and a third data transmission time. The first data transmission time is a data transmission time between the first-level node and the first target node. The second data transmission time is a data transmission time between the first-level node and the second target node. The third data transmission time is a data transmission time between the second target node and the first target node.

Step 405 may be specifically implemented by using the following operations of 4051 to 4056, and the operations of 4051 to 4056 are as follows:

4051: The gateway node selects one node from the first node set as the first target node, and selects another node as the second target node.

For example, as shown in FIG. 13, for the first-level node A1, for the first node set including child nodes of the first-level node A1, the first node set includes the nodes B1, B2, C1, C2, C3, and C4. The node B1 is selected from the first node set as the first target node, and the node B2 is selected from the first node set as the second target node.

4052: The gateway node obtains the third data transmission time between the first target node and the second target node.

In this step, the gateway node may send a measurement request to the first target node in the power distribution network. The measurement request includes an identifier of the second target node, a frequency offset between the timing frequency of the gateway node and timing frequency of the first target node, and a frequency offset between the timing frequency of the gateway node and timing frequency of the second target node. The first target node receives the measurement request and obtains the third data transmission time between the first target node and the second target node. For the obtaining process, refer to the operations (1)-(5) described above. Details are not described herein again. The first target node sends a measurement response to the gateway node. The measurement response carries the third data transmission time. The gateway node receives the measurement response, and extracts the third data transmission time between the first target node and the second target node from the measurement response.

4053: The gateway node determines whether the first data transmission time between the first-level node and the first target node, the second data transmission time between the first-level node and the second target node, and the third data transmission time between the second target node and the first target node satisfy the first condition; and if the first data transmission time, the second data transmission time, and the third data transmission time do not satisfy the first condition, that is, the second target node does not satisfy the first condition, performs 4054; or if the first data transmission time, the second data transmission time, and the third data transmission time satisfy the first condition, that is, the second target node satisfies the first condition, performs 4056.

The first data transmission time is the data transmission time that is between the first-level node and the first target node and that is obtained in step 404. The second data transmission time is the data transmission time that is between the first-level node and the second target node and that is obtained in step 404.

The obtained data transmission time between the first-level node A1 and the first target node B1 is 5. The data transmission time between the first-level node A1 and the second target node B2 is 8. The data transmission time between the first target node B1 and the second target node B2 is 13. The gateway node determines that the first data transmission time 5 is not equal to the sum of the second data transmission time 8 and the third data transmission time 13, that is, the second target node B2 does not satisfy the first condition, the gateway node performs an operation of the following 4054.

4054: The gateway node determines whether nodes that are not selected as the second target node exist among nodes other than the first target node in the first node set; and if such nodes exist, selects a node from the nodes that are not selected as the second target node as the second target node, and returns to 4052; or if such nodes do not exist, performs 4055.

For example, the nodes, other than the first target node B1, that are not selected as the second target node in the first node set include nodes C1, C2, C3, and C4. The gateway node selects the node C1 as the second target node from the nodes C1, C2, C3, and C4, returns to 4052, and determines that the second target node C1 does not satisfy the first condition. The foregoing process is repeated, and it is finally determined that none of the nodes C2, C3, and C4 satisfies the first condition. Then, 4055 is performed.

4055: The gateway node uses the first target node as a second-level node directly connected to the first-level node, and performs 4056.

For example, the gateway node uses the first target node B1 as a second-level node directly connected to the first-level node A1, and performs 4056.

4056: The gateway node determines whether nodes that are not selected as the first target node exist in the first node set; and if such nodes exist, selects one node from the nodes that are not selected as the first target node as the first target node, selects one node from nodes other than the first target node in the first node set as the second target node, and returns to 4052; or if such nodes do not exist, stops returning.

For example, as shown in FIG. 13, the nodes that are not selected as the first target node in the first node set include nodes B2, C1, C2, C3, and C4. The gateway node selects the node B2 from the nodes B2, C1, C2, C3, and C4 as the first target node, selects the node C1 from nodes other than the first target node B2 in the first node set as the second target node, and returns to the foregoing 4052. The operations of the foregoing 4052 to 4056 are repeated, and it is finally determined that second-level nodes connected to the first-level node A1 are the nodes B1 and B2.

Refer to FIG. 13. The first-level node A2 is processed according to the foregoing operation performed on the first-level node A1, to obtain second-level nodes B3 and B4 that are directly connected to the first-level node A2.

In step 406, the gateway node generates the physical network topology diagram, where the physical network topology diagram includes the connection relationship between the first-level power distribution equipment on which the first-level node is located and the second-level power distribution equipment on which the second-level node is located.

Specifically, the gateway node obtains, from the node list based on the identifier of the first-level node, the basic information about the power distribution equipment on which the first-level node is located; and obtains, from the node list based on the identifier of the second-level node, the basic information about the power distribution equipment on which the second-level node is located. A first-level icon and a second-level icon are generated based on the basic information about the power distribution equipment on which the first-level node is located and the basic information about the power distribution equipment on which the second-level node is located. The first-level icon is used to represent the power distribution equipment on which the first-level node is located, and the first-level icon may store the basic information about the power distribution equipment on which the first-level node is located. The second-level icon is used to represent the power distribution equipment on which the second-level node is located, and the second-level icon may store the basic information about the power distribution equipment on which the second-level node is located. A connection line is provided between the first-level icon and the second-level icon. The connection line represents a connection relationship between the first-level power distribution equipment on which the first-level node is located and the second-level power distribution equipment on which the second-level node is located.

Optionally, a length of the connection line may be determined based on a signal transmission time between the first-level node and the second-level node.

Optionally, when the power distribution network includes a plurality of first-level power distribution equipments, in the physical network topology diagram, an icon corresponding to a transformer may further be generated and a connection line between the icon corresponding to the transformer and a first-level icon corresponding to each first-level power distribution equipment may be generated.

Figure 14:
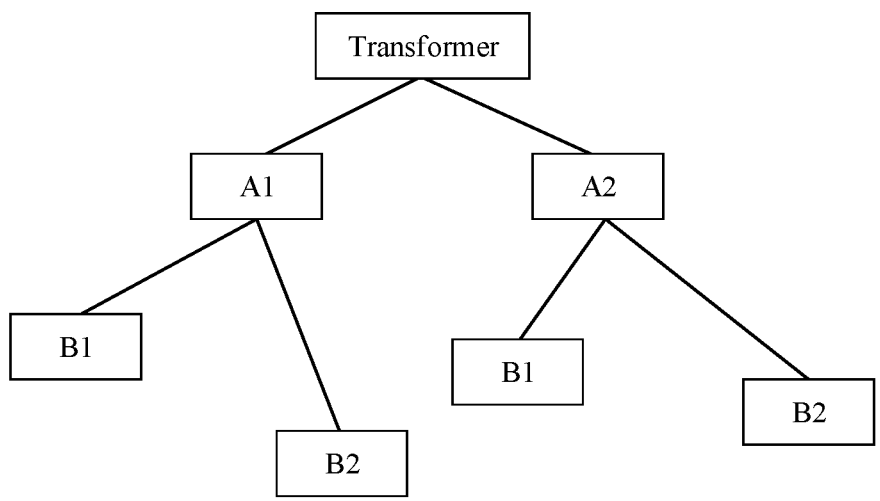
FIG. 14 is a physical network topology diagram according to an embodiment of this application.

For example, as shown in FIG. 14, in a physical network topology diagram, an icon corresponding to a transformer is generated, a first-level icon A1 corresponding to first-level power distribution equipment on which a first-level node A1 is located and a first-level icon A2 corresponding to first-level power distribution equipment on which a first-level node A2 is located are generated, a connection line is generated between the icon corresponding to the transformer and the first-level icon A1, and a connection line is generated between the icon corresponding to the transformer and the second-level icon A2.

A second-level icon B1 corresponding to second-level power distribution equipment on which a second-level node B1 is located, a second-level icon B2 corresponding to second-level power distribution equipment on which a second-level node B2 is located, a second-level icon B3 corresponding to second-level power distribution equipment on which a second-level node B3 is located, a second-level icon B4 corresponding to second-level power distribution equipment on which a second-level node B4 is located are generated. A connection line is generated between the first-level icon A1 and the second-level icon B1. A connection line is generated between the first-level icon A1 and the second-level icon B2. A connection line is generated between the first-level icon A2 and the second-level icon B3. A connection line is generated between the first-level icon A2 and the second-level icon B4.

In step 407, the gateway node obtains the data transmission time between the $i^{th}$-level node in the first node set and the parent node of the i'-level node, the data transmission time between the $i^{th}$-level node and each node in the second node set, and the data transmission time between the parent node and each node in the second node set, where i=2, 3, . . . , and the second node set includes the node located on each level of power distribution equipment after the i'-level power distribution equipment.

The second node set is a subset of the first node set.

For each determined $i^{th}$-level node, the gateway node may send a measurement request to the $i^{th}$-level node, where the measurement request carries identifiers of all nodes in the second node set, a frequency offset between the timing frequency of the gateway node and timing frequency of the $i^{th}$-level node, and a frequency offset between the timing frequency of the gateway node and timing frequency of each node in the second node set. The i'-level node receives the measurement request, selects one node from the nodes corresponding to identifiers of all the nodes in the second node set, and obtains a data transmission time between the $i^{th}$-level node and the node. Optionally, the data transmission time may be obtained by using the method in the embodiment shown in FIG. 11. When the method in the embodiment shown in FIG. 11 is used, the $i^{th}$-level node is used as the first device and the node is used as the second device; and then, the $i^{th}$-level node obtains the data transmission time by using the method. After obtaining the data transmission time between the $i^{th}$-level node and each node in the second node set, the $i^{th}$-level node sends a measurement response to the gateway node. The measurement response carries the data transmission time between the $i^{th}$-level node and each node in the second node set.

When determining a level to which the parent node of the $i^{th}$-level node belongs, the gateway node has obtained and stored the data transmission time between the parent node and the $i^{th}$-level node and the data transmission time between the parent node and each node in the second node set. Therefore, in this step, the gateway node may obtain the stored data transmission time between the parent node and the $i^{th}$-level node and the stored data transmission time between the parent node and each node in the second node set.

For example, as shown in FIG. 13, for the determined second-level node B1, the second node set includes a node on each level of power distribution equipment located after the second-level power distribution equipment. The second node set is a subset of the first node set, to be specific, the second node set includes nodes C1, C2, C3, and C4. The gateway node sends a measurement request to the second-level node B1, where the measurement request includes an identifier of the node C1, an identifier of the node C2, an identifier of the node C3, an identifier of the node C4, a frequency offset between the timing frequency of the gateway node and the timing frequency of the second-level node B1, and a frequency offset between the timing frequency of the gateway node and the timing frequency of each node in the second node set. The second-level node B1 receives the measurement request, the identifier of C1, the identifier of C2, the identifier of C3, and the identifier of C4 in the measurement request; separately obtains that a data transmission time between the second-level node B1 and the node C1 is 5, a data transmission time between the second-level node B1 and the node C2 is 7, a data transmission time between the second-level node B1 and the node C3 is 18, and a data transmission time between the second-level node B1 and the node C4 is 21; and sends a measurement response to the gateway node, where the measurement response carries the data transmission time 5 between the second-level node B1 and the node C1, the data transmission time 7 between the second-level node B1 and the node C2, the data transmission time 18 between the second-level node B1 and the node C3, and the data transmission time 21 between the second-level node B1 and the node C4.

The parent node of the second-level node B2 is the first-level node A1. When determining the first-level node A1, the gateway node has obtained that a data transmission time between the first-level node A1 and the node C1 is 10, a data transmission time between the first-level node A1 and the node C2 is 12, a data transmission time between the first-level node A1 and the node C3 is 13, and a data transmission time between the first-level node A1 and the node C4 is 18.

In step 408, the gateway node selects, from the second node set, the first node satisfying the third condition, to obtain the child node of the $i^{th}$-level node.

The third condition is that a seventh data transmission time is equal to a difference between an eighth data transmission time and a ninth data transmission time. The seventh data transmission time is a data transmission time between the first node and the $i^{th}$-level node. The eighth data transmission time is a data transmission time between the first node and the parent node. The ninth data transmission time is a data transmission time between the $i^{th}$-level node and the parent node.

During implementation, the child node belonging to the $i^{th}$-level node may be determined through operations of the following 4081 to 4085. The operations of 4081 to 4085 are as follows:

4081: The gateway node selects one node from the second node set as a first node.

4082: The gateway node determines whether the seventh data transmission time between the $i^{th}$-level node and the first node, the eighth data transmission time between the parent node and the first node, and the ninth data transmission time between the parent node and the $i^{th}$-level node satisfy the foregoing third condition.

4083: If the third condition is satisfied, use the first node as the child node of the $i^{th}$-level node; and when there still are unselected nodes in the second node set, select one node from the unselected nodes as the first node, and return to 4082.

For example, the gateway node selects the node C1 as the first node. The seventh data transmission time between the second-level node B1 and the first node C1 is 5. The eighth data transmission time between the first-level node A1 and the first node C1 is 10. The ninth data transmission time between the second-level node B1 and the first-level node A1 is 5. The seventh data transmission time 5 is equal to a difference between the eighth data transmission time 10 and the ninth data transmission time 5. Therefore, the first node C1 is a child node of the second-level node B1.

The unselected nodes in the second node set include nodes C2, C3, and C4. The node C2 is selected from the nodes C2, C3, and C4 as the first node. The foregoing process is repeated, and it is determined that the node C2 satisfies the third condition and is also a child node of the second-level node B1.

The unselected nodes in the second node set include nodes C3 and C4. The node C3 is selected from the nodes C3 and C4 as the first node. The foregoing process is repeated, and it is determined that the node C3 does not satisfy the third condition. Then, an operation of the following 4084 is performed.

4084: If the second condition is not satisfied, when there still are unselected nodes in the second node set, select one node from the unselected nodes as the first node, and return to 4082.

If all nodes in the second node set are selected, returning ends. There may be a plurality of $i^{th}$-level node. For another $i^{th}$-level node, the foregoing process of 4081 to 4084 is repeated to determine a child node of the another $i^{th}$-level node.

For example, the unselected nodes in the second node set include a node C4. The gateway node selects the node C4 as the first node, continues to repeat the foregoing process, determines that the node C4 does not satisfy the third condition, and stops returning.

For the second-level node B2, the foregoing process of 4081 to 4084 is repeated, and it is determined that child nodes of the second-level node B2 include the nodes C3 and C4. For the second-level node B4, the foregoing process of 4081 to 4084 is repeated, and it is determined that child nodes of the second-level node B4 include the nodes C5 and C6.

In step 409, the fifth target node is determined as the $(i+1)^{th}$-level node directly connected to the $i^{th}$-level node, when the sixth target node satisfying the fourth condition does not exist between the $i^{th}$-level node and the fifth target node.

Specifically, the fifth target node is any child node of the $i^{th}$-level node. The fourth target node is a node other than the fifth target node among the child nodes of the $i^{th}$-level node. The fourth condition is that a tenth data transmission time is equal to a sum of an eleventh data transmission time and a twelfth data transmission time. The tenth data transmission time is a data transmission time between the $i^{th}$-level node and the fifth target node. The eleventh data transmission time is a data transmission time between the $i^{th}$-level node and the sixth target node. The twelfth data transmission time is a data transmission time between the sixth target node and the fifth target node.

Step 409 may be specifically implemented by using the following operations of 4091 to 4096, and the operations of 4091 to 4096 are as follows:

4091: The gateway node selects one node from the child nodes of the $i^{th}$-level node as the fifth target node, and selects another node as the sixth target node.

For example, as shown in FIG. 13, for the second-level node B1, the node C1 is selected from the child nodes C1 and C2 of the second-level node B1 as the fifth target node, and the node C2 is selected as the sixth target node.

4092: The gateway node obtains the twelfth data transmission time between the fifth target node and the sixth target node.

In step 409, the gateway node may send a measurement request to the fifth target node in the power distribution network. The measurement request includes an identifier of the sixth target node, a frequency offset between the timing frequency of the gateway node and timing frequency of the fifth target node, and a frequency offset between the timing frequency of the gateway node and timing frequency of the sixth target node. The fifth target node receives the measurement request, and obtains the twelfth data transmission time between the fifth target node and the sixth target node based on the identifier of the sixth target node, the frequency offset between the timing frequency of the gateway node and the timing frequency of the fifth target node, and the frequency offset between the timing frequency of the gateway node and the timing frequency of the sixth target node that are carried in the measurement request. Optionally, the data transmission time may be obtained by using the method in the embodiment shown in FIG. 11. When the method in the embodiment shown in FIG. 11 is used, the fifth target node is used as the first device and the sixth target node is used as the second device; and then, the fifth target node obtains the data transmission time by using the method. Next, the fifth target node sends a measurement response to the gateway node, where the measurement response carries the twelfth data transmission time. The gateway node receives the measurement response, and extracts the twelfth data transmission time between the fifth target node and the sixth target node from the measurement response.

4093: The gateway node determines whether the tenth data transmission time between the $i^{th}$-level node and the fifth target node, the eleventh data transmission time between the $i^{th}$-level node and the sixth target node, and the twelfth data transmission time between the fifth target node and the sixth target node satisfy the fourth condition; and if the tenth data transmission time, the eleventh data transmission time, and the twelfth data transmission time do not satisfy the fourth condition, that is, the fifth target node does not satisfy the fourth condition, performs 4094; or if the tenth data transmission time, the eleventh data transmission time, and the twelfth data transmission time satisfy the fourth condition, that is, the fifth target node satisfies the fourth condition, performs 4096.

The tenth data transmission time is the data transmission time that is between the $i^{th}$-level node and the fifth target node and that is obtained in step 408. The eleventh data transmission time is the data transmission time that is between the first-level node and the sixth target node and that is obtained in step 408.

For example, the obtained tenth data transmission time between the second-level node B1 and the fifth target node C1 is 5. The eleventh data transmission time between the second-level node B1 and the sixth target node C2 is 7. The data transmission time between the fifth target node C1 and the sixth target node C2 is 12. The gateway node determines that the tenth data transmission time 5 is not equal to the sum of the eleventh data transmission time 7 and the twelfth data transmission time 12, that is, the sixth target node C2 does not satisfy the fourth condition, the gateway node performs an operation of the following 4094.

4094: The gateway node determines whether nodes that are not selected as the sixth target node exist among child nodes of the $i^{th}$-level node other than the fifth target node; and if such nodes exist, selects a node from the nodes that are not selected as the sixth target node as the sixth target node, and returns to 4092; or if such nodes do not exist, performs 4095.

For example, if no node that is not selected as the sixth target node exists among the child nodes of the first target node B1 other than the fifth target node C1, step 4095 is performed.

4095: The gateway node uses the fifth target node as an $(i+1)^{th}$-level node directly connected to the $i^{th}$-level node, and performs 4096.

For example, the gateway node uses the fifth target node C1 as a third-level node directly connected to the second-level node B1, and performs 4096.

4096: The gateway node determines whether nodes that are not selected as the fifth target node exist in the child nodes of the $i^{th}$-level node; and if such nodes exist, selects one node from the nodes that are not selected as the fifth target node as the fifth target node, selects one node from nodes other than the fifth target node in the child nodes of the $i^{th}$-level node as the sixth target node, and returns to 4092; or if such nodes do not exist, stops returning.

For example, as shown in FIG. 13, the nodes that are not selected as the fifth target node in the child nodes of the second-level node B1 include the node C2. The gateway node selects the node C2 as the fifth target node, selects the node C1 from the child nodes of the second-level node B1 other than the fifth target node C2 as the sixth target node, and returns to 4092. The operations of the foregoing 4092 to 4096 are repeated, and the third-level node C2 connected to the second-level node B1 is determined.

Refer to FIG. 13. The second-level node B2 is processed according to the foregoing operation performed on the second-level node B1, to obtain third-level nodes C3 and C4 that are directly connected to the second-level node B2. The second-level node B2 is processed according to the foregoing operation performed on the second-level node B1, to obtain third-level nodes C5 and C6 that are directly connected to the second-level node B4.

In step 410, the gateway node generates, in the physical network topology diagram, the connection relationship between the $i^{th}$-level power distribution equipment on which the $i^{th}$-level node is located and the $(i+1)^{th}$-level power distribution equipment on which the $(i+i)^{th}$-level node is located.

Specifically, the gateway node obtains, from the node list based on the identifier of the $i^{th}$-level node, the basic information about the power distribution equipment on which the $i^{th}$-level node is located; and obtains, from the node list based on the identifier of the $(i+1)^{th}$-level node, the basic information about the power distribution equipment on which the $(i+1)^{th}$-level node is located. An $i^{th}$-level icon and an $(i+1)^{th}$-level icon are generated based on the basic information about the power distribution equipment on which the $i^{th}$-level node is located and the basic information about the power distribution equipment on which the $(i+1)^{th}$-level node is located. The $i^{th}$-level icon is used to represent the $i^{th}$-level power distribution equipment on which the $i^{th}$-level node is located, and the $i^{th}$-level icon may store the basic information about the $i^{th}$-level power distribution equipment. The $(i+1)^{th}$-level icon is used to represent the $(i+1)^{th}$-level power distribution equipment on which the $(i+1)^{th}$-level node is located, and the $(i+1)^{th}$-level icon may store the basic information about the $(i+1)^{th}$-level power distribution equipment. A connection line is provided between the $i^{th}$-level icon and the $(i+1)^{th}$-level icon. The connection line represents a connection relationship between the $i^{th}$-level power distribution equipment on which the $i^{th}$-level node is located and the $(i+1)^{th}$-level power distribution equipment on which the $(i+1)^{th}$-level node is located.

Optionally, a length of the connection line may be determined based on a signal transmission time between the $i^{th}$-level node and the $(i+1)^{th}$-level node.

Figure 15:
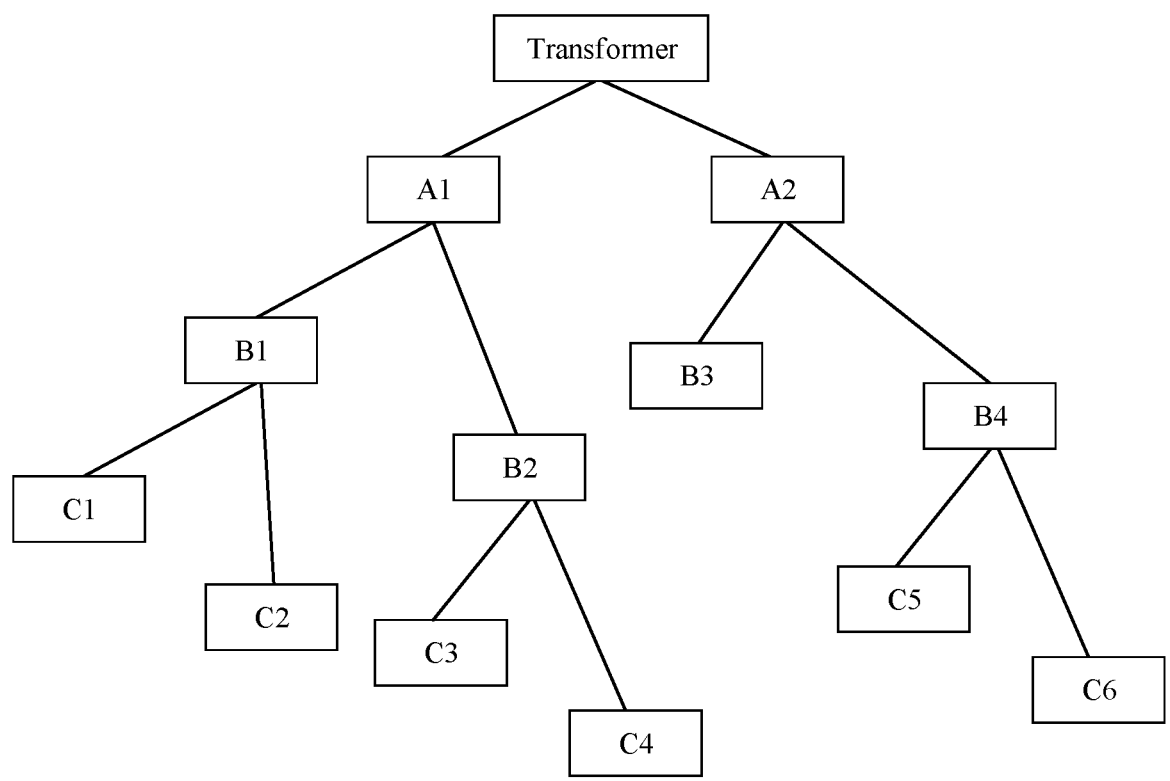
FIG. 15 is another physical network topology diagram according to an embodiment of this application.

For example, as shown in FIG. 15, a third-level icon C1 corresponding to third-level power distribution equipment on which a third-level node C1 is located, a third-level icon C2 corresponding to third-level power distribution equipment on which a third-level node C2 is located, a third-level icon C3 corresponding to third-level power distribution equipment on which a third-level node C3 is located, a third-level icon C4 corresponding to third-level power distribution equipment on which a third-level node C4 is located, a third-level icon C5 corresponding to third-level power distribution equipment on which a third-level node C5 is located, and a third-level icon C6 corresponding to third-level power distribution equipment on which a third-level node C6 is located are generated. A connection line is generated between the second-level icon B1 and the third-level icon C1. A connection line is generated between the second-level icon B1 and the third-level icon C2. A connection line is generated between the second-level icon B2 and the third-level icon C3. A connection line is generated between the second-level icon B2 and the third-level icon C4. A connection line is generated between the second-level icon B4 and the third-level icon C5. A connection line is generated between the second-level icon B4 and the third-level icon C6.

The foregoing process of steps 407 to 410 is repeated until various levels of power distribution equipments and a connection relationship between the various levels of power distribution equipments in the power distribution network are determined.

Power distribution equipment includes one input terminal a plurality of output terminals. An output terminal of $j^{th}$-level power distribution equipment is connected to an input terminal of $(j+1)^{th}$-level power distribution equipment, where j=1, 2, . . . . A connection relationship between the $j^{th}$-level power distribution equipment and the $(j+1)^{th}$-level power distribution equipment is reflected in the foregoing generated physical network topology diagram, but an output terminal of the $j^{th}$-level power distribution equipment connected to the input terminal of the $(j+1)^{th}$-level power distribution equipment cannot be reflected. Therefore, an output terminal of the $j^{th}$-level power distribution equipment connected to the input terminal of the $(j+1)j^{th}$-level power distribution equipment needs to be determined through the following operation.

In step 411, the gateway node obtains the electrical signal feature that is output by the target output terminal of the $j^{th}$-level power distribution equipment, and obtains the electrical signal feature of the input terminal of each $(j+1)^{th}$-level power distribution equipment connected to the $j^{th}$-level power distribution equipment, where the target output terminal is any output terminal of the $j^{th}$-level power distribution equipment.

For any level of power distribution equipment, for example, for the $j^{th}$-level power distribution equipment, the gateway node may determine, through operations of the following 4111 to 4115, the $(j+1)^{th}$-level power distribution equipment connected to the output terminal of the $j^{th}$-level power distribution equipment. The operations of 4111 to 4115 may be as follows:

4111: The gateway node selects one $j^{th}$-level power distribution equipment, selects one output terminal from output terminals of the $j^{th}$-level power distribution equipment as a target output terminal, and determines each $(j+1)^{th}$-level power distribution equipment connected to the $j^{th}$-level power distribution equipment.

Optionally, the gateway node obtains, based on the physical network topology diagram, basic information about one $j^{th}$-level power distribution equipment and basic information about each $(j+1)^{th}$-level power distribution equipment connected to the $j^{th}$-level power distribution equipment. The basic information about the $j^{th}$-level power distribution equipment includes an identifier of each output terminal of the $j^{th}$-level power distribution equipment. The basic information about the $(j+1)^{th}$-level power distribution equipment includes an identifier of an input terminal of the $(j+1)^{th}$-level power distribution equipment. The gateway node selects an identifier of an output terminal from identifiers of all output terminals of the $j^{th}$-level power distribution equipment as an identifier of the target output terminal.

4112: The gateway node sends a first energy-efficiency measurement request to a $j^{th}$-level node on the $j^{th}$-level power distribution equipment, where the first energy-efficiency measurement request carries the identifier of the target output terminal; and sends a second energy-efficiency measurement request to a $(j+1)^{th}$ node on the $(j+1)^{th}$-level power distribution equipment, where the second energy-efficiency measurement request carries the identifier of the input terminal of the $(j+1)^{th}$-level power distribution equipment.

Optionally, the gateway node may obtain, from the node list based on the identifier of the $j^{th}$-level power distribution equipment, the identifier of the $j^{th}$-level node located on the $j^{th}$-level power distribution equipment, and send a first energy-efficiency measurement request to the $j^{th}$-level node based on the identifier of the $j^{th}$-level node, where the first energy-efficiency measurement request carries the identifier of the target output terminal; and obtains, from the node list based on the identifier of the $(j+1)^{th}$-level power distribution equipment, the identifier of the $(j+1)^{th}$-level node located on the $(j+1)^{th}$-level power distribution equipment, and sends a first energy-efficiency measurement request to the $(j+1)^{th}$-level node based on the identifier of the $(j+1)^{th}$-level node.

Optionally, when each output terminal of the $j^{th}$-level power distribution equipment is provided with one $j^{th}$-level node, the gateway node obtains, from a correspondence between an identifier of a node, an identifier of port, and an identifier of power distribution equipment based on the identifier of the $j^{th}$-level power distribution equipment and the identifier of the target output terminal, an identifier of the $j^{th}$-level node located at the target output terminal; and sends, based on the identifier of the $j^{th}$-level node located at the target output terminal, a first energy-efficiency measurement request to the $j^{th}$-level node located at the target output terminal.

Optionally, when an input terminal and each output terminal of the $(j+1)^{th}$-level power distribution equipment are provided with one $(j+1)^{th}$-level node, the gateway node obtains, from a correspondence between an identifier of a node, an identifier of a port, and an identifier of power distribution equipment based on the identifier of the $(j+1)^{th}$-level power distribution equipment and the identifier of the input terminal of the $(j+1)^{th}$-level power distribution equipment, an identifier of the $(j+1)^{th}$-level node located at the input terminal of the $(j+1)^{th}$-level power distribution equipment; and sends a second energy-efficiency measurement request to the $(j+1)^{th}$-level node based on the identifier of the $(j+1)^{th}$-level node.

4113: The $j^{th}$-level node receives the first energy-efficiency measurement request; controls, based on the identifier of the target output terminal included in the first energy-efficiency measurement request, an energy-efficiency collection terminal located at the target output terminal to collect an electrical signal feature of the target output terminal; and sends a first energy-efficiency measurement response to the gateway node, where the first energy-efficiency measurement response carries the electrical signal feature of the target output terminal.

The electrical signal feature of the target output terminal may be a magnitude of a current or a voltage that is output by the target output terminal. The energy-efficiency collection terminal located at the target output terminal may collect a magnitude of at least one current or at least one voltage, use the magnitude of the at least one current or the at least one voltage as the electrical signal feature of the target output terminal, and send the electrical signal feature of the target output terminal to the $j^{th}$-level node.

Optionally, when the energy-efficiency collection terminal collects magnitudes of a plurality of currents or voltages, the electrical signal feature may be a vector including the magnitudes of the plurality of currents or a vector including the magnitudes of the plurality of voltages.

The $j^{th}$-level node is connected to the energy-efficiency collection terminal through a 485 interface. The energy-efficiency collection terminal sends data in a 485 format to the $j^{th}$-level node. Therefore, the electrical signal feature of the target output terminal that is sent by the energy-efficiency collection terminal and that is received by the $j^{th}$-level node is data in the 485 format. The $j^{th}$-level node converts the data format of the electrical signal feature of the target output terminal into a PLC format, and then sends a first energy-efficiency measurement response to the gateway node, where the first energy-efficiency measurement response carries the electrical signal feature of the target output terminal in the PLC format.

4114: The $(j+1)^{th}$-level node receives the second energy-efficiency measurement request; controls, based on the identifier of the input terminal of the $(j+1)^{th}$-level power distribution equipment included in the second energy-efficiency measurement request, the energy-efficiency collection terminal located at the input terminal of the $(j+1)^{th}$-level power distribution equipment to collect the electrical signal feature of the input terminal; and sends a second energy-efficiency measurement response to the gateway node, where the second energy-efficiency measurement response carries the electrical signal feature of the input terminal of the $(j+1)^{th}$-level power distribution equipment.

The electrical signal feature of the input terminal of the $(j+1)^{th}$-level power distribution equipment may be a magnitude of a current or a voltage that is input to the input terminal. The energy-efficiency collection terminal located at the input terminal may collect a magnitude of at least one current or at least one voltage, use the magnitude of the at least one current or the at least one voltage as the electrical signal feature of the input terminal, and send the electrical signal feature of the input terminal to the $(j+1)^{th}$-level node.

Optionally, when the energy-efficiency collection terminal collects magnitudes of a plurality of input currents or voltages, the electrical signal feature may be a vector including the magnitudes of the plurality of currents or a vector including the magnitudes of the plurality of voltages.

The $(j+1)^{th}$-level node is connected to the energy-efficiency collection terminal through a 485 interface. The energy-efficiency collection terminal sends data in a 485 format to the $(j+1)^{th}$-level node. Therefore, the electrical signal feature of the input terminal that is sent by the energy-efficiency collection terminal and that is received by the $(j+1)^{th}$-level node is data in the 485 format. The $(j+1)^{th}$-level node converts the data format of the electrical signal feature of the input terminal into a PLC format, and then sends a second energy-efficiency measurement response to the gateway node, where the second energy-efficiency measurement response carries the electrical signal feature of the input terminal in the PLC format.

For each of other $(j+1)^{th}$-level nodes, an electrical signal feature of an input terminal of $(j+1)^{th}$-level power distribution equipment on which the $(j+1)^{th}$-level node is located is sent to the gateway node according to the operation of 4114.

4115: The gateway node receives the first energy-efficiency measurement response, extracts the electrical signal feature of the target output terminal of the $j^{th}$-level power distribution equipment from the first energy-efficiency measurement response, receives the second energy-efficiency measurement response sent by the $(j+1)^{th}$-level node located on the $(j+1)^{th}$-level power distribution equipment, and extracts the electrical signal feature of the input terminal of the $(j+1)^{th}$-level power distribution equipment from the second energy-efficiency measurement response.

In step 412, the gateway node determines, based on the electrical signal feature that is output by the target output terminal and the electrical signal feature of the input terminal of each $(j+1)^{th}$-level power distribution equipment, the $(j+1)^{th}$-level power distribution equipment connected to the target output terminal.

Optionally, step 412 may be implemented by using the following operations of 4121 to 4122. The operations of 4121 to 4122 are as follows:

4121: The gateway node obtains an electrical signal correlation coefficient between the target output terminal and an input terminal of each $(j+1)^{th}$-level power distribution equipment based on the electrical signal feature of the target output terminal and the electrical signal feature of the input terminal of each $(j+1)^{th}$-level power distribution equipment.

For each $(j+1)^{th}$-level power distribution equipment, an electrical signal correlation coefficient between the target output terminal and an input terminal of the $(j+1)^{th}$-level power distribution equipment is obtained based on the electrical signal feature of the target output terminal, an electrical signal feature of the input terminal of the $(j+1)^{th}$-level power distribution equipment, and the following fourth formula.

The fourth formula is:

$$r = \frac{\mathrm{Cov}(X, Y)}{\sqrt{\mathrm{Var}[x] \cdot \mathrm{Var}[Y]}}.$$

In the fourth formula, r is the electrical signal correlation coefficient between the target output terminal and the input terminal of the $(j+1)^{th}$-level power distribution equipment, X is the electrical signal feature of the target output terminal, and Y is the electrical signal feature of the input terminal of the $(j+1)^{th}$-level power distribution equipment.

4122: The gateway node selects $(j+1)^{th}$-level power distribution equipment with a largest electrical signal correlation coefficient with the target output terminal, and determines that an input terminal of the selected $(j+1)^{th}$-level power distribution equipment is connected to the target output terminal of the $j^{th}$-level power distribution equipment.

In step 413, the gateway node generates, in the physical network topology diagram, the connection relationship between the target output terminal and the input terminal of the determined $(j+1)^{th}$-level power distribution equipment.

Specifically, the gateway node may draw an image of the target output terminal in a $j^{th}$-level icon corresponding to the $j^{th}$-level power distribution equipment, and draw an image of the input terminal of the $(j+1)^{th}$ power distribution equipment in a $(j+1)^{th}$-level icon corresponding to the determined $(j+1)^{th}$-level power distribution equipment. For a connection line connecting the $j^{th}$-level power distribution equipment and the determined $(j+1)^{th}$-level power distribution equipment in the physical network topology diagram, it is set that the connection line connects the image of the target output terminal in the $j^{th}$-level icon and the image of the input terminal in the $(j+1)^{th}$-level icon.

Figure 16:
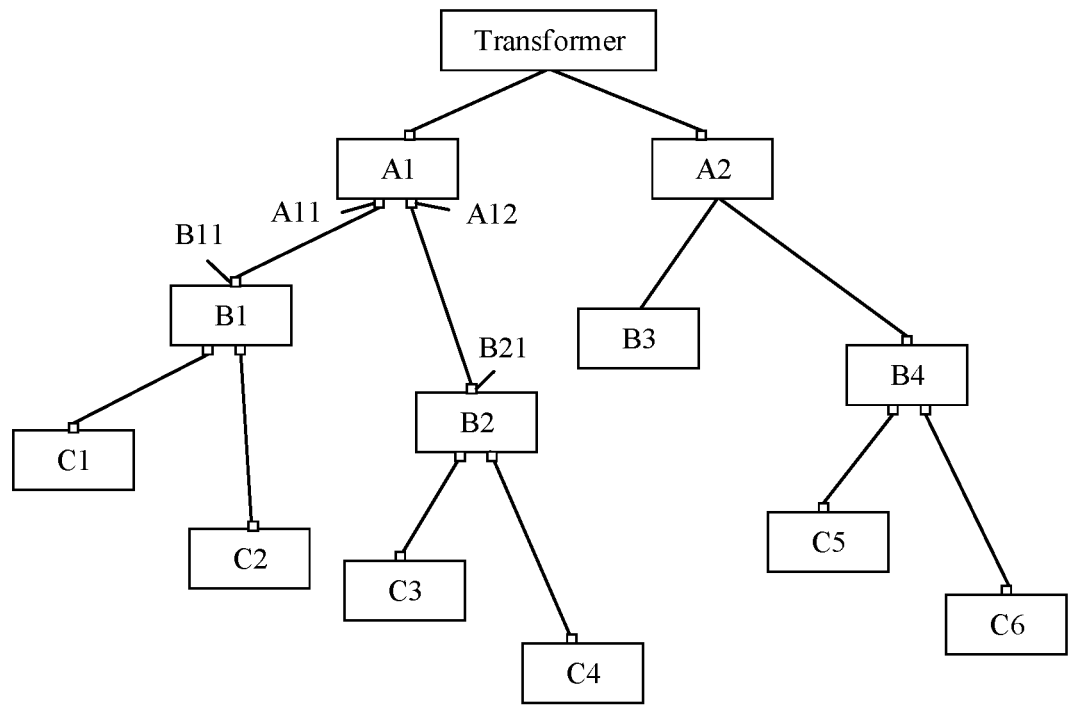
FIG. 16 is another physical network topology diagram according to an embodiment of this application.

Optionally, the identifier of the target output terminal may further be displayed in the physical network topology diagram. For example, as shown in FIG. 16, it is assumed that the gateway node determines, through the foregoing operations of steps 411 and 412, that the $1^{st}$ output terminal of first-level power distribution equipment A1 is connected to an input terminal of second-level power distribution equipment B1 and the $2^{nd}$ output terminal of the first-level power distribution equipment A1 is connected to an input terminal of second-level power distribution equipment B2. The gateway node draws, in the physical network topology diagram, an image A11 of the $1^{st}$ output terminal of the first-level power distribution equipment A1, an image A12 of the $2^{nd}$ output terminal of the first-level power distribution equipment A1, an image B11 of the input terminal of the second-level power distribution equipment B1, and an image B21 of the input terminal of the second-level power distribution equipment. For a connection line between the first-level power distribution equipment A1 and the second-level power distribution equipment B1, it is set that the connection line connects the image A11 of the $1^{st}$ output terminal and the image B11 of the input terminal. For a connection line between the first-level power distribution equipment A1 and the second-level power distribution equipment B2, it is set that the connection line connects the image A12 of the $2^{nd}$ output terminal and the image B11 of the input terminal. As shown in FIG. 16, for another-level power distribution equipment, an image of an output terminal and an image of an input terminal are also drawn in the same manner.

The gateway node repeats steps 411 to 413 until $(j+1)^{th}$-level power distribution equipments connected to all output terminals of the $j^{th}$-level power distribution equipment are determined; and generates, in the physical network topology diagram, the connection relationship between an output terminal of the $j^{th}$-level power distribution equipment and the input terminal of the $(j+1)^{th}$-level power distribution equipment connected to the output terminal.

Optionally, the gateway node may further send the generated physical network topology diagram of the power distribution network to the management terminal.

Optionally, when the administrator needs to query basic information about power distribution equipment stored in a node in the power distribution network, the management terminal corresponding to the administrator may send a query instruction to the gateway node via the communication network, where the query instruction includes an identifier of the to-be-queried node. The gateway node receives the query instruction, converts a format of the query instruction into a packet format that can be transmitted on a PLC network, and sends the converted query instruction to the to-be-queried node. The to-be-queried node receives the query instruction and returns a query response, where the query response includes the basic information about the power distribution equipment stored in the to-be-queried node. The gateway node receives the query response, converts a format of the query response into a packet format that can be transmitted on the communication network, and sends the converted query response to the management terminal via the communication network. The management terminal receives the converted query response.

In the embodiments of this application, the gateway node may obtain the data transmission time between the gateway node and each node in the power distribution network, and determine the first-level node based on the data transmission time between the gateway node and each node. The gateway node obtains the data transmission time between the first-level node and each node in the first node set, where the first node set includes the child node of the first-level node; and determines, based on the data transmission time between the first-level node and each node in the first node set, the second-level node directly connected to the first-level node, to generate a physical network topology diagram, where the physical network topology diagram includes the connection relationship between the first-level power distribution equipment on which the first-level node is located and the second-level power distribution equipment on which the second-level node is located. For the $i^{th}$-level node, the gateway node may obtain the data transmission time between the $i^{th}$-level node and each node in the second node set; determine, based on the data transmission time between the $i^{th}$-level node and each node in the second node set, the $(i+1)^{th}$-level node directly connected to the $i^{th}$-level node; and generate, in the physical network topology diagram, the connection relationship between the $i^{th}$-level power distribution equipment on which the $i^{th}$-level node is located and the $(i+1)^{th}$-level power distribution equipment on which the $(i+1)^{th}$-level node is located. The foregoing processing process of the $i^{th}$-level node is repeated until the physical network topology diagram of the entire power distribution network is obtained. In this way, compared with a manner of manually generating a physical network topology diagram, this method improves efficiency of generating a physical network topology diagram, and avoids a physical network topology diagram generation error caused due to a manual input error. In addition, when a topology of the power distribution network changes, a newest physical network topology diagram can be generated in time. Because the data transmission time used by the gateway node to generate the physical network topology diagram is obtained by using a packet, and the packet is sent in the power distribution network by using a carrier signal, a misoperation such as tripping of the power distribution equipment in the power distribution network is not caused, thereby improving security of the power distribution network. Further, the gateway node may obtain an electrical signal feature that is output by a target output terminal of one $j^{th}$-level power distribution equipment and an electrical signal feature of an input terminal of each $(j+1)^{th}$-level power distribution equipment connected to the $j^{th}$-level power distribution equipment; determine, based on the electrical signal feature that is output by the target output terminal and the electrical signal feature of the input terminal of each $(j+1)^{th}$-level power distribution equipment, the $(j+1)^{th}$-level power distribution equipment connected to the target output terminal; and generate the connection relationship between the target output terminal and the input terminal of the determined $(j+1)^{th}$-level power distribution equipment in the physical network topology diagram. In this way, the generated physical network topology diagram not only includes a connection relationship between any level of power distribution equipment and a previous level of power distribution equipment, but also includes a connection relationship between an input terminal of the level of power distribution equipment and an output terminal of the previous level of power distribution equipment.

Figure 17:
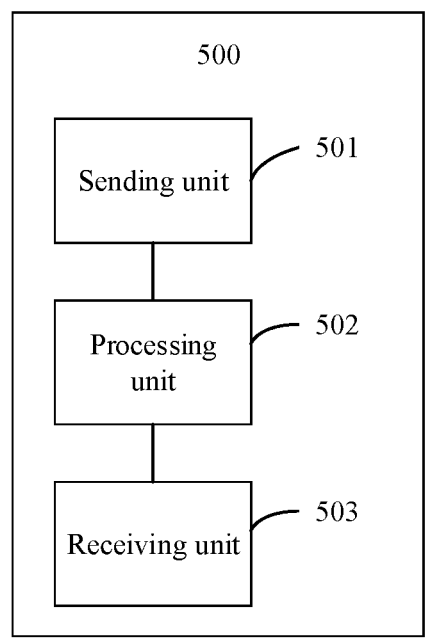
FIG. 17 is a schematic diagram of a structure of a data transmission time obtaining apparatus according to an embodiment of this application.

Refer to FIG. 17. An embodiment of this application provides a data transmission time obtaining apparatus 500. The apparatus 500 is deployed on the first device shown in any one of the foregoing embodiments, is applied to a PLC network, and includes:

a sending unit 501, configured to send a first packet to a second device;

a processing unit 502, configured to obtain a first send timestamp of the first packet; and a receiving unit 503, configured to receive a second packet that is sent by the second device and that corresponds to the first packet.

The processing unit 502 is further configured to obtain a first receive timestamp of the second packet.

The processing unit 502 is further configured to calculate, based on timing frequency of the second device, a second receive timestamp at which the second device receives the first packet and a second send timestamp at which the second device sends the second packet.

The processing unit 502 is further configured to calculate a data transmission time between the apparatus 500 and the second device based on the first send timestamp, the first receive timestamp, the second send timestamp, and the second receive timestamp.

Optionally, for a detailed implementation process in which the processing unit 502 calculates the data transmission time, refer to related content in step 108 in the embodiment shown in FIG. 8, step 208 in the embodiment shown in FIG. 10, or step 306 in the embodiment shown in FIG. 11.

Optionally, the processing unit 502 is further configured to:

calculate the timing frequency of the second device based on timing frequency of the apparatus 500 and a frequency offset between the timing frequency of the apparatus 500 and the timing frequency of the second device.

Optionally, the receiving unit 503 is further configured to receive a plurality of third packets sent by the second device at different moments, where any one of the plurality of third packets includes a first value, and the first value is a value displayed on a timestamp counter of the second device when the second device sends the third packet.

The processing unit 502 is further configured to: obtain a value displayed on a timestamp counter of the apparatus 500 when the receiving unit 503 receives the third packet, to obtain a second value; and calculate the frequency offset based on the timing frequency of the apparatus 500, the first value included in each of the plurality of third packets, and each second value obtained by the apparatus 500.

Optionally, for a detailed implementation process in which the processing unit 502 calculates the frequency offset, refer to related content in steps 102 and 103 in the embodiment shown in FIG. 8.

Optionally, the sending unit 501 is further configured to send a plurality of third packets to the second device at different moments, where each of the third packets includes a first value, the first value is a value displayed on a timestamp counter of the apparatus 500 when the apparatus 500 sends the third packet, and the plurality of third packets are used by the second device to calculate the frequency offset; and the receiving unit 503 is further configured to receive the frequency offset sent by the second device.

Optionally, the sending unit 501 is further configured to send a sequence signal to the second device, where signal change frequency of the sequence signal is determined based on timing frequency of the apparatus 500, and the sequence signal is used by the second device to synchronize the timing frequency of the second device with the timing frequency of the apparatus 500.

Optionally, the apparatus 500 includes a timestamp counter, and the timestamp counter performs counting based on the timing frequency of the apparatus 500.

The processing unit 502 is configured to:

obtain a third value, where the third value is a value displayed on the timestamp counter of the apparatus 500 when the sending unit 501 sends the first packet; and obtain the first send timestamp of the first packet based on the third value and the timing frequency of the apparatus 500.

Optionally, for a detailed implementation process in which the processing unit 502 obtains the first send timestamp, refer to related content in step 104 in the embodiment shown in FIG. 8, step 204 in the embodiment shown in FIG. 10, or step 302 in the embodiment shown in FIG. 11.

Optionally, the processing unit 502 is configured to:

obtain a fourth value, where the fourth value is a value displayed on the timestamp counter of the apparatus 500 when the receiving unit 503 receives the second packet; and obtain a first receive timestamp of the second packet based on the fourth value and the timing frequency of the apparatus 500.

Optionally, for a detailed implementation process in which the processing unit 502 obtains the first receive timestamp, refer to related content in step 106 in the embodiment shown in FIG. 8 or step 206 in the embodiment shown in FIG. 10.

Optionally, the second packet includes a fifth value and a sixth value, the fifth value is a value displayed on the timestamp counter of the second device when the second device receives the first packet, the sixth value is a value displayed on the timestamp counter of the second device when the second device sends the second packet, and the timestamp counter of the second device is configured to perform counting based on the timing frequency of the second device.

The processing unit 502 is configured to:
calculate, based on the fifth value and the timing frequency of the second device, the second receive timestamp at which the second device receives the first packet; and
calculate, based on the sixth value and the timing frequency of the second device, the second send timestamp at which the second device sends the second packet.

Optionally, for a detailed implementation process in which the processing unit 502 calculates the second receive timestamp and the second send timestamp, refer to related content in step 107 in the embodiment shown in FIG. 8 or step 207 in the embodiment shown in FIG. 10.

Optionally, the processing unit 502 may be implemented by the processor 31 in the embodiment shown in FIG. 7 by invoking instructions in the memory 35. The sending unit 501 and the receiving unit 503 may be implemented by the PLC communication module 32 in the embodiment shown in FIG. 7.

In this embodiment of this application, the sending unit sends the first packet to the second device, and the processing unit obtains the first send timestamp of the first packet. The receiving unit receives the second packet that is sent by the second device and that corresponds to the first packet. The processing unit obtains the first receive timestamp of the second packet; calculates, based on the timing frequency of the second device, the second receive timestamp at which the second device receives the first packet and the second send timestamp at which the second device sends the second packet; and calculates the data transmission time between the first device and the second device based on the first send timestamp, the first receive timestamp, the second send timestamp, and the second receive timestamp. Because the processing unit can accurately calculate, based on the timing frequency of the second device, the second receive timestamp at which the second device receives the first packet and the second send timestamp at which the second device sends the second packet, time synchronization between the apparatus 500 and the second device is not required. Therefore, no synchronization circuit needs to be disposed on the apparatus 500 and the second device. This reduces costs.

Figure 18:
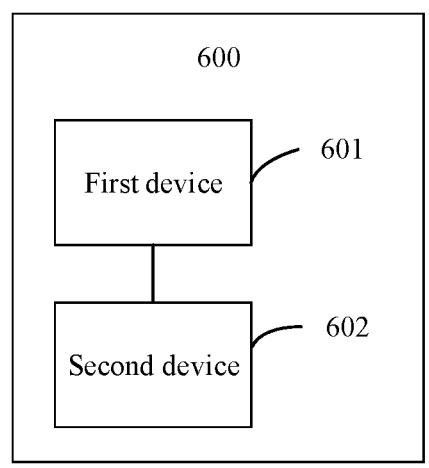
FIG. 18 is a schematic diagram of a structure of a data transmission time obtaining system according to an embodiment of this application.

Refer to FIG. 18. An embodiment of this application provides a data transmission time obtaining system 600. The system 600 includes a first device 601 and a second device 602.

The first device 601 is configured to: send a first packet to the second device 602, and obtain a first send timestamp of the first packet.

The second device 602 is configured to: receive the first packet, and send a second packet to the first device 601.

The first device 601 is configured to: receive the second packet, and obtain a first receive timestamp of the second packet; calculate, based on timing frequency of the second device 602, a second receive timestamp at which the second device 602 receives the first packet and a second send timestamp at which the second device 602 sends the second packet; and calculate a data transmission time between the first device 601 and the second device 602 based on the first send timestamp, the first receive timestamp, the second send timestamp, and the second receive timestamp.

Figure 19:
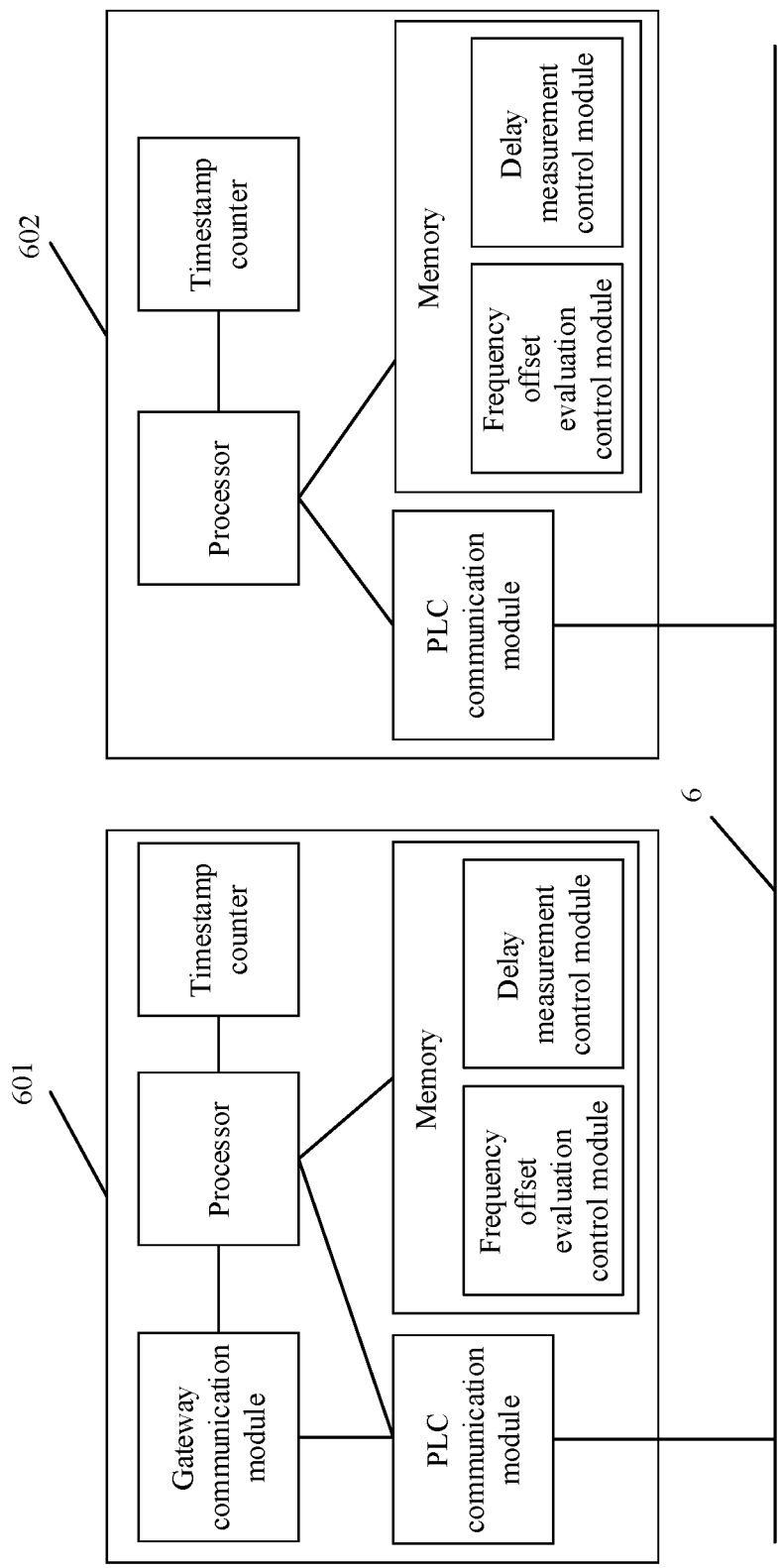
FIG. 19 is a schematic diagram of a structure of another data transmission time obtaining system according to an embodiment of this application.
Figure 20:
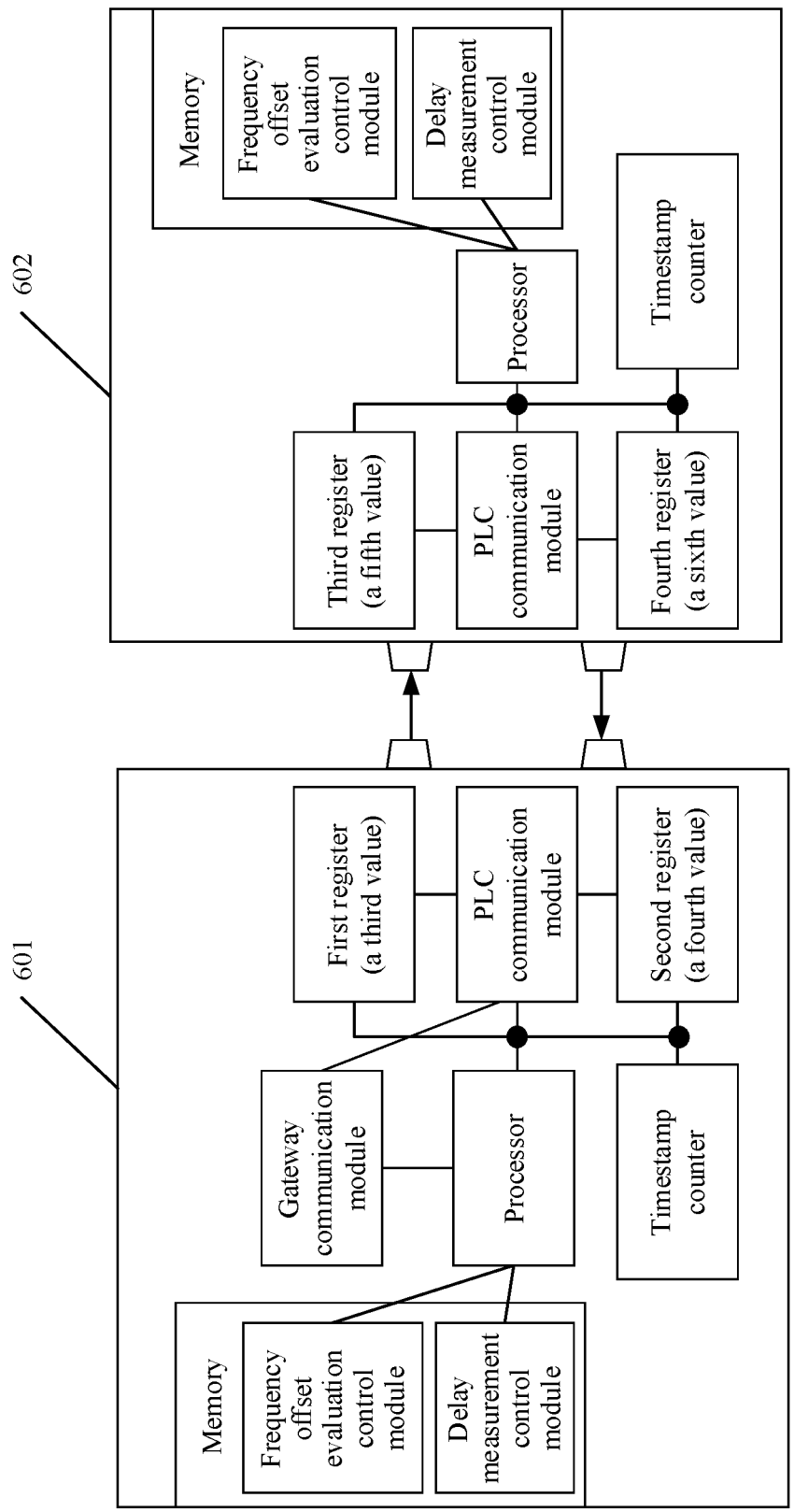
FIG. 20 is a schematic diagram of a structure of another data transmission time obtaining system according to an embodiment of this application.

Optionally, the first device 601 may be a gateway node in a power distribution network, and a structure thereof may be the device in the embodiment shown in FIG. 7. The second device 602 may be a node on power distribution equipment in the power distribution network. Compared with the first device 601, the second device 602 does not have a gateway communication module. Refer to FIG. 19 and FIG. 20 (compared with FIG. 7, FIG. 19 and FIG. 20 mainly describe PLC communication modules, processors, and memories; and the timing frequency generation circuit in FIG. 7 is not described herein again, and therefore, the timing frequency generation circuit is not drawn in FIG. 19 or FIG. 20). The first device 601 is connected to a power line 6 through the PLC communication module. The second device 602 is connected to a power line 6 through the PLC communication module. The PLC communication module of the first device 601 may send a packet to the second device 602 through the power line 6 or receive a packet from the second device 602 through the power line 6.

Optionally, as shown in FIG. 19 and FIG. 20, the memory of the first device 601 stores a frequency offset evaluation control module and a delay measurement control module, and the memory of the second device 602 stores a frequency offset evaluation control module and a delay measurement control module. The processor of the first device 601 may invoke and execute the frequency offset evaluation control module to send a third packet to the second device 602 through the PLC communication module of the first device 601. The processor of the second device 602 may invoke and execute the frequency offset evaluation control module to receive the third packet through the PLC communication module of the second device 602 and obtain a frequency offset between timing frequency of the first device 601 and timing frequency of the second device 602 based on the third packet. The processor of the first device 601 may invoke and execute the delay measurement control module to obtain a data transmission time between the first device 601 and the second device 602.

Optionally, as shown in FIG. 20, the first device 601 may further include a first register and a second register, and the second device 602 may further include a third register and a fourth register. When the first device 601 starts to obtain the data transmission time between the first device 601 and the second device 602, the first device 601 sends the first packet to the second device 602 through the PLC communication module of the first device 601, reads a third value from a timestamp counter, and stores the third value in a first register. The second device 602 receives the first packet, reads a fifth value from a local timestamp counter, and stores the fifth value in the third register; when determining to send the second packet, reads a sixth value from the local timestamp counter and stores the sixth value in the fourth register; and sends the second packet to the first device 601 through the PLC communication module, where the second packet includes the fifth value stored in the third register and the sixth value stored in the fourth register. The first device 601 receives the second packet through the PLC communication module, reads the fourth value from the local timestamp counter, and stores the fourth value in the second register. Then, the first device 601 may obtain a data transmission time between the first device 601 and the second device 602 based on the obtained frequency offset, the timing frequency of the first device 601, the first value stored in the first register, the fourth value stored in the second register, and the fifth value and the fourth value that are included in the second packet.

In this embodiment of this application, because the first device can accurately calculate, based on the timing frequency of the second device, the second receive timestamp at which the second device receives the first packet and the second send timestamp at which the second device sends the second packet, time synchronization between the first device and the second device is not required when a data transmission delay is being obtained. Therefore, no synchronization circuit needs to be disposed on the first device and the second device. This reduces costs.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing description is merely an embodiment of this application, but is not intended to limit this application. Any modification, equivalent replacement, or improvement made without departing from the principle of this application should fall within the protection scope of this application.

What is claimed is:

1. A data transmission time obtaining method, wherein the method is applied to a power line communication (PLC) network, and comprises:
   sending, by a first device, a first packet to a second device, and obtaining a first send timestamp of the first packet;
   receiving, by the first device, a second packet that is sent by the second device and that corresponds to the first packet, and obtaining a first receive timestamp of the second packet;
   determining, by the first device, timing frequency of the second device based on timing frequency of the first device and a frequency offset between the timing frequency of the first device and the timing frequency of the second device;
   determining, by the first device based on the timing frequency of the second device, a second receive timestamp at which the second device receives the first packet and a second send timestamp at which the second device sends the second packet; and
   determining, by the first device, a data transmission time between the first device and the second device based on the first send timestamp, the first receive timestamp, the second send timestamp, and the second receive timestamp.

2. The method according to claim 1, wherein before determining the timing frequency of the second device, the method further comprises:
   receiving, by the first device, a plurality of third packets sent by the second device at different moments, wherein any one of the plurality of third packets comprises a first value, and the first value is a value displayed on a timestamp counter of the second device in response to the second device sending the third packet;
   obtaining, by the first device, a value displayed on a timestamp counter of the first device in response to the first device receiving the third packet, to obtain a second value; and
   determining, by the first device, the frequency offset based on the timing frequency of the first device, the first value comprised in each of the plurality of third packets, and each second value obtained by the first device.

3. The method according to claim 1, wherein before determining the timing frequency of the second device, the method further comprises:
sending, by the first device, a plurality of third packets to the second device at different moments, wherein each of the third packets comprises a first value, the first value is a value displayed on a timestamp counter of the first device in response to the first device sending the third packet, and the plurality of third packets are used by the second device to determine the frequency offset; and
   receiving, by the first device, the frequency offset sent by the second device.

4. The method according to claim 1, wherein before sending the first packet to the second device, the method further comprises:
   sending, by the first device, a sequence signal to the second device, wherein signal change frequency of the sequence signal is determined based on the timing frequency of the first device, and the sequence signal is used by the second device to synchronize the timing frequency of the second device with the timing frequency of the first device.

5. The method according to claim 1, wherein the first device comprises a timestamp counter, and the timestamp counter performs counting based on the timing frequency of the first device; and
   wherein obtaining the first send timestamp of the first packet comprises:
   obtaining, by the first device, a third value, wherein the third value is a value displayed on the timestamp counter of the first device in response to the first device sending the first packet; and
   obtaining, by the first device, the first send timestamp of the first packet based on the third value and the timing frequency of the first device.

6. The method according to claim 5, wherein obtaining the first receive timestamp of the second packet comprises:
   obtaining, by the first device, a fourth value, wherein the fourth value is a value displayed on the timestamp counter of the first device in response to the first device receiving the second packet; and
   obtaining, by the first device, the first receive timestamp of the second packet based on the fourth value and the timing frequency of the first device.

7. The method according to claim 1, wherein the second packet comprises a fifth value and a sixth value, the fifth value is a value displayed on a timestamp counter of the second device in response to the second device receiving the first packet, the sixth value is a value displayed on the timestamp counter of the second device in response to the second device sending the second packet, and the timestamp counter of the second device is configured to perform counting based on the timing frequency of the second device; and
   wherein determining the second receive timestamp at which the second device receives the first packet and the second send timestamp at which the second device sends the second packet comprises:
   determining, by the first device based on the fifth value and the timing frequency of the second device, the second receive timestamp at which the second device receives the first packet; and
   determining, by the first device based on the sixth value and the timing frequency of the second device, the second send timestamp at which the second device sends the second packet.

8. A data transmission time obtaining apparatus, wherein the apparatus is applied to a power line communication (PLC) network, and comprises a memory and a processor;

wherein the memory is coupled to the processor, and the memory comprises program instructions which are run by the processor to cause the apparatus to:

send a first packet to a second device;

obtain a first send timestamp of the first packet;

receive a second packet that is sent by the second device and that corresponds to the first packet;

obtain a first receive timestamp of the second packet;

determine timing frequency of the second device based on timing frequency of the apparatus and a frequency offset between the timing frequency of the apparatus and the timing frequency of the second device;

determine, based on the timing frequency of the second device, a second receive timestamp at which the second device receives the first packet and a second send timestamp at which the second device sends the second packet; and determine a data transmission time between the apparatus and the second device based on the first send timestamp, the first receive timestamp, the second send timestamp, and the second receive timestamp.

9. The apparatus according to claim 8, wherein the program instructions are run by the processor to further cause the apparatus to:

receive a plurality of third packets sent by the second device at different moments, wherein any one of the plurality of third packets comprises a first value, and the first value is a value displayed on a timestamp counter of the second device in response to the second device sending the third packet;

obtain a value displayed on a timestamp counter of the apparatus in response to the apparatus receiving the third packet, to obtain a second value; and determine the frequency offset based on the timing frequency of the apparatus, the first value comprised in each of the plurality of third packets, and each second value obtained by the apparatus.

10. The apparatus according to claim 8, wherein the program instructions are run by the processor to further cause the apparatus to:

send a plurality of third packets to the second device at different moments, wherein each of the third packets comprises a first value, the first value is a value displayed on a timestamp counter of the apparatus in response to the apparatus sending the third packet, and the plurality of third packets are used by the second device to determine the frequency offset; and receive the frequency offset sent by the second device.

11. The apparatus according to claim 8, wherein the program instructions are run by the processor to further cause the apparatus to:

send a sequence signal to the second device, wherein signal change frequency of the sequence signal is determined based on the timing frequency of the apparatus, and the sequence signal is used by the second device to synchronize the timing frequency of the second device with the timing frequency of the apparatus.

12. The apparatus according to claim 8, wherein the apparatus comprises a timestamp counter, and the timestamp counter performs counting based on the timing frequency of the apparatus; and wherein the program instructions are run by the processor to further cause the apparatus to:

obtain a third value, wherein the third value is a value displayed on the timestamp counter of the apparatus in response to the apparatus sending the first packet; and obtain the first send timestamp of the first packet based on the third value and the timing frequency of the apparatus.

13. The apparatus according to claim 12, wherein the program instructions are run by the processor to further cause the apparatus to:

obtain a fourth value, wherein the fourth value is a value displayed on the timestamp counter of the apparatus in response to the apparatus receiving the second packet; and obtain the first receive timestamp of the second packet based on the fourth value and the timing frequency of the apparatus.

14. The apparatus according to claim 8, wherein the second packet comprises a fifth value and a sixth value, the fifth value is a value displayed on a timestamp counter of the second device in response to the second device receiving the first packet, the sixth value is a value displayed on the timestamp counter of the second device in response to the second device sending the second packet, and the timestamp counter of the second device is configured to perform counting based on the timing frequency of the second device; and wherein the program instructions are run by the processor to further cause the apparatus to:

determine, based on the fifth value and the timing frequency of the second device, the second receive timestamp at which the second device receives the first packet; and determine, based on the sixth value and the timing frequency of the second device, the second send timestamp at which the second device sends the second packet.

15. A data transmission time obtaining system, wherein the system is applied to a power line communication (PLC) network, and the system comprises a first device and a second device, wherein the first device is configured to: send a first packet to a second device, and obtain a first send timestamp of the first packet;

the second device is configured to: receive the first packet, and send a second packet to the first device; and the first device is further configured to: receive the second packet, and obtain a first receive timestamp of the second packet; determine timing frequency of the second device based on timing frequency of the first device and a frequency offset between the timing frequency of the first device and the timing frequency of the second device; determine, based on the timing frequency of the second device, a second receive timestamp at which the second device receives the first packet and a second send timestamp at which the second device sends the second packet; and determine a data transmission time between the first device and the second device based on the first send timestamp, the first receive timestamp, the second send timestamp, and the second receive timestamp.

16. The system according to claim 15, wherein the first device is further configured to:

receive a plurality of third packets sent by the second device at different moments, wherein any one of the plurality of third packets comprises a first value, and the first value is a value displayed on a timestamp counter of the second device in response to the second device sending the third packet;

obtain a value displayed on a timestamp counter of the first device in response to the first device receiving the third packet, to obtain a second value; and determine the frequency offset based on the timing frequency of the first device, the first value comprised in each of the plurality of third packets, and each second value obtained by the first device.

17. The system according to claim 15, wherein the first device is further configured to:

send a plurality of third packets to the second device at different moments, wherein each of the third packets comprises a first value, the first value is a value displayed on a timestamp counter of the first device in response to the first device sending the third packet, and the plurality of third packets are used by the second device to determine the frequency offset; and receive the frequency offset sent by the second device.

* * * * *